(12) United States Patent
Ito et al.

(10) Patent No.: US 7,825,978 B2
(45) Date of Patent: Nov. 2, 2010

(54) IMAGING APPARATUS

(75) Inventors: Junichi Ito, Fuchu (JP); Masataka Ide, Hachioji (JP); Takeru Hokkezu, Hachioji (JP)

(73) Assignee: Olympus Imaging Corporation, Tokyo (JP)

( * ) Notice: Subject to any disclaimer, the term of this patent is extended or adjusted under 35 U.S.C. 154(b) by 441 days.

(21) Appl. No.: 12/070,127

(22) Filed: Feb. 15, 2008

(65) Prior Publication Data

US 2009/0009617 A1    Jan. 8, 2009

(30) Foreign Application Priority Data

Feb. 23, 2007    (JP)    ................ 2007-44382

(51) Int. Cl.
H04N 5/228    (2006.01)
H04N 5/222    (2006.01)

(52) U.S. Cl. ............... 348/333.01; 348/333.02; 348/333.09; 348/222.1

(58) Field of Classification Search .......... 348/222.1, 348/333.1, 333.02, 333.09
See application file for complete search history.

(56) References Cited

U.S. PATENT DOCUMENTS 5,086,217 A * 2/1992 Ishida et al. ............. 250/201.8

5,541,706 A * 7/1996 Goto ........................ 396/231

FOREIGN PATENT DOCUMENTS

| JP | 2000-333064 A |   | 11/2000 |
|----|---------------|---|---------|
| JP | 2004048470 A  | * | 2/2004  |
| JP | 2006-340277 A |   | 12/2006 |

* cited by examiner

*Primary Examiner*—James M Hannett
(74) *Attorney, Agent, or Firm*—Holtz, Holtz, Goodman & Chick, PC

(57) ABSTRACT

The object of the present invention is to provide an imaging apparatus capable of preventing the degradation of image quality associated with a temperature rise in an image pickup device despite that an electronic viewfinder is usable. An imaging apparatus including an image pickup device for capturing a subject image to acquire it as image data and capable of viewing a subject by selecting either of a first finder mode for optical viewing of the subject image and a second finder mode for displaying the image data on a display unit to allow viewing of the image data, the imaging apparatus comprises: a temperature detection circuit for measuring the temperature of the image pickup device; a finder mode switching instruction part for switching between the first finder mode and the second finder mode; and a controller for inhibiting switching from the first finder mode to the second finder mode performed by the finder mode switching instruction part when the temperature exceeds a first threshold.

23 Claims, 20 Drawing Sheets

| SHOOTING MODE | | THRESHOLD Tth1 (°C) | THRESHOLD Tth2 (°C) |
|---|---|---|---|
| STILL IMAGE | HIGH QUALITY | 38 | 40 |
| | MEDIUM QUALITY | 43 | 45 |
| | LOW QUALITY | 46 | 48 |
| MOVING IMAGE | HIGH QUALITY | 42 | 44 |
| | MEDIUM QUALITY | 45 | 47 |
| | LOW QUALITY | 50 | 52 |
| . . | . . | . . | . . |

IMAGING APPARATUS

CROSS-REFERENCE TO RELATED APPLICATION

This application is based upon and claims the benefit of priority from prior Japanese Patent Application No. 2007-044382 filed on Feb. 23, 2007, the entire contents of which are incorporated herein by reference.

BACKGROUND OF THE INVENTION

1. Field of the Invention

The present invention relates to an imaging apparatus capable of viewing a subject by selecting either a first finder mode for optical viewing of the subject image or a second finder mode for electronic viewing of the subject image acquired by an image pickup device and displayed on a display unit.

2. Description of the Related Art

There is known an imaging apparatus (electronic camera) so-called digital camera having two finder modes: one is a mode for viewing of a subject image through an optical finder including an optical member such as a pentaprism or Porro prism, and the other is a mode for electronic viewing of a subject image through a live view display in such a manner that image data acquired by an image pickup device such as a CCD image sensor or a CMOS image sensor is displayed on a image display unit such as an LCD device as the live view display (through image display). The latter finder mode is referred to as an electronic viewfinder (EVF).

An electronic camera provided with these two finder modes is disclosed, for example, in Japanese Patent Application Laid-Open No. 2000-333064.

In the meantime, in case of use of an electronic viewfinder in an imaging apparatus provided with an optical finder and the electronic viewfinder, the temperature of an image pickup device such as a CCD increases because of continuous driving of the image pickup device. The temperature rise in the image pickup device results in an increase in noise called dark noise or fixed-pattern noise. For this reason, a problem arises that the image quality of the image data acquired is degraded at the time of use of the electronic viewfinder.

BRIEF SUMMARY OF THE INVENTION

The present invention has been made in view of the above problem and it is an object of the present invention to provide an imaging apparatus capable of preventing the degradation of image quality associated with a temperature rise in an image pickup device despite that an electronic viewfinder is usable.

In one aspect of the present invention, there is provided an imaging apparatus including an image pickup device for capturing a subject image to acquire it as image data and capable of selecting either of a first finder mode for optical viewing of the subject image and a second finder mode for displaying the image data on a display unit to allow viewing of the image data, the imaging apparatus comprising: a temperature detection circuit for measuring the temperature of the image pickup device; a finder mode switching instruction part for switching between the first finder mode and the second finder mode; and a controller for inhibiting switching from the first finder mode to the second finder mode performed by the finder mode switching instruction part when the temperature exceeds a first threshold.

In another aspect of the present invention, there is provided an imaging apparatus including an image pickup device for capturing an subject image to acquire it as image data and capable of selecting either of a first finder mode for optical viewing of the subject image and a second finder mode for displaying the image data on a display unit to allow viewing of the image data, the imaging apparatus comprising: a noise level detection circuit for detecting the noise level of the image pickup device; a finder mode switching instruction part for switching between the first finder mode and the second finder mode; and a controller for inhibiting switching from the first finder mode to the second finder mode performed by the finder mode switching instruction part when the noise level exceeds a first threshold.

In still another aspect of the present invention, there is provided an imaging apparatus including an image pickup device for capturing an subject image to acquire it as image data and capable of selecting either of a first finder mode for optical viewing of the subject image and a second finder mode for displaying the image data on a display unit to allow viewing of the image data, the imaging apparatus comprising: a temperature detection circuit for measuring the temperature of the image pickup device; a finder mode switching instruction part for switching between the first finder mode and the second finder mode; and a controller for causing the finder mode switching instruction part to perform switching from the second finder mode to the first finder mode when the temperature exceeds a second threshold on condition that the second finder mode is selected, and causing the display unit to change from display of the subject image to display of the temperature.

In yet another aspect of the present invention, there is provided an imaging apparatus including an image pickup device for capturing an subject image to acquire it as image data and capable of selecting either of a first finder mode for optical viewing of the subject image and a second finder mode for displaying the image data on a display unit to allow viewing of the image data, the imaging apparatus comprising: a preparation instruction part for causing preparation for acquiring image data of a still image from the image pickup device; a temperature detection circuit for measuring the temperature of the image pickup device; a finder mode switching instruction part for switching between the first finder mode and the second finder mode; and a controller for causing the finder mode switching instruction part to perform switching from the second finder mode to the first finder mode when the temperature exceeds a predetermined threshold on condition that the second finder mode is selected, wherein the controller inhibits the switching operation performed by the finder mode switching instruction part while the preparation instruction part is being operated.

In yet another aspect of the present invention, there is provided an imaging apparatus including an image pickup device for capturing an subject image to acquire it as image data and capable of selecting either of a first finder mode for optical viewing of the subject image and a second finder mode for displaying the image data on a display unit to allow viewing of the image data, the imaging apparatus comprising: a temperature detection circuit for measuring the temperature of the image pickup device; an interface circuit for acquiring image data from the image pickup device; a finder mode switching instruction part for switching between the first finder mode and the second finder mode; and a controller for changing operation conditions of the interface circuit to reduce power to be consumed by the image pickup device and the interface circuit when the temperature exceeds to a first threshold on condition that the second finder mode is selected, and stopping the system of the imaging apparatus when the temperature exceeds a second threshold on condition that the second finder mode is selected, wherein upon changing the operation conditions, the controller causes the interface circuit to reduce a drive frequency of the image pickup device and the amount of data for one frame to be read from the image pickup device.

According to such a structure of the present invention, if the temperature of the imaging apparatus or the noise level of the image pickup device exceeds a predetermined threshold, use of the electronic viewfinder can be inhibited. This can prevent the degradation of image quality associated with a temperature rise in the image pickup device or an increase in the noise level of the image pickup device.

BRIEF DESCRIPTION OF THE SEVERAL VIEWS OF THE DRAWINGS

These and other features, aspects, and advantages of the apparatus of the present invention will become better understood with regard to the following description, appended claims, and accompanying drawings where:

DETAILED DESCRIPTION OF THE PREFERRED EMBODIMENTS

Preferred embodiments of the invention are described below with reference to the accompanying drawings.

First Embodiment

A first embodiment of the present invention will now be described with reference to FIGS. 1 to 10. In the embodiment to be described below, the present invention is applied to a lens interchangeable autofocus single-lens reflex (SLR) type electronic still camera (hereinafter referred to as "single-lens reflex camera") typified as an imaging apparatus. The electronic still camera is generally referred to as an electronic camera, a digital camera, or a digital still camera.

Figure 1:
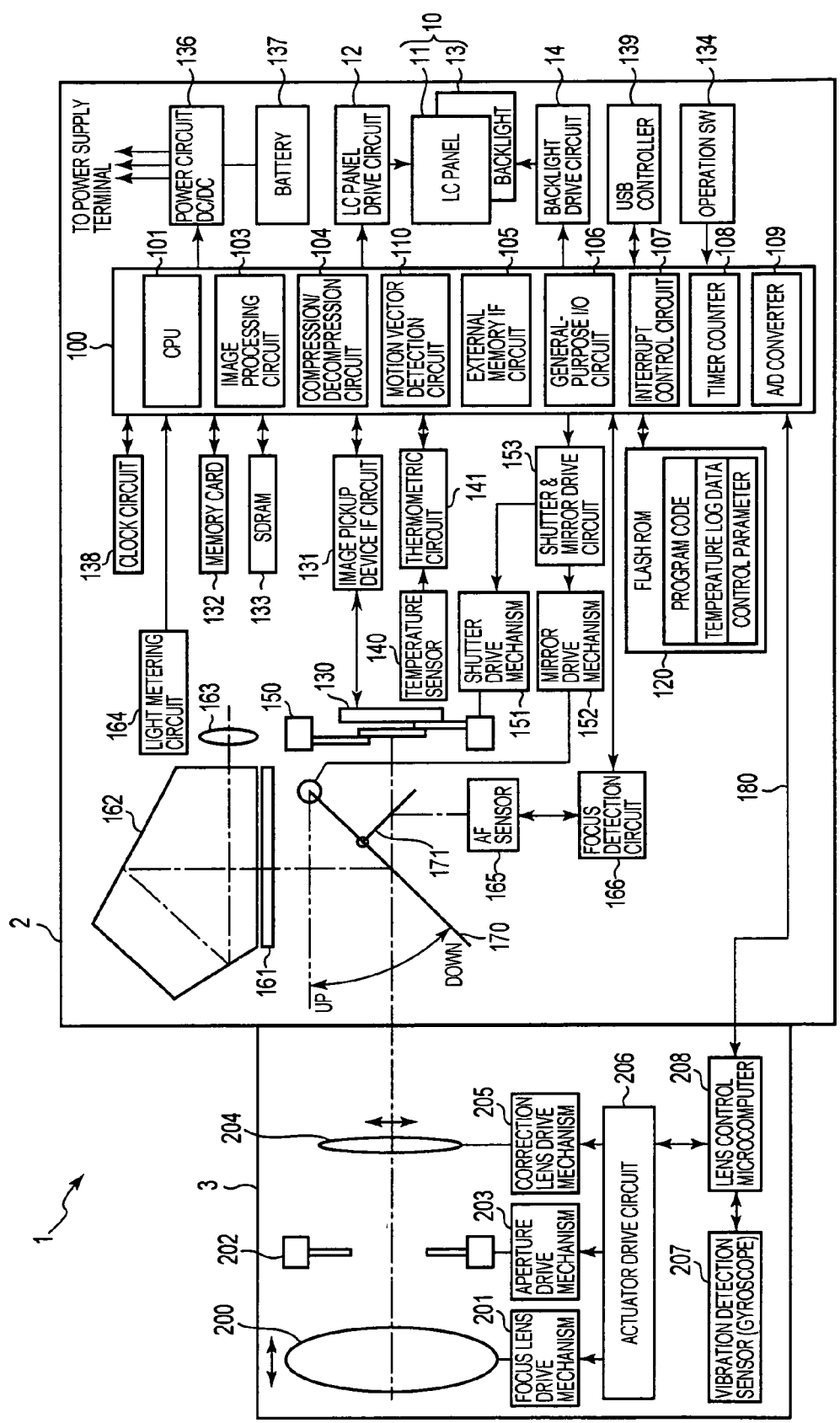
FIG. 1 is a block diagram showing the main structure of a single lens reflect camera according to a first embodiment of the present invention.
Figure 6:
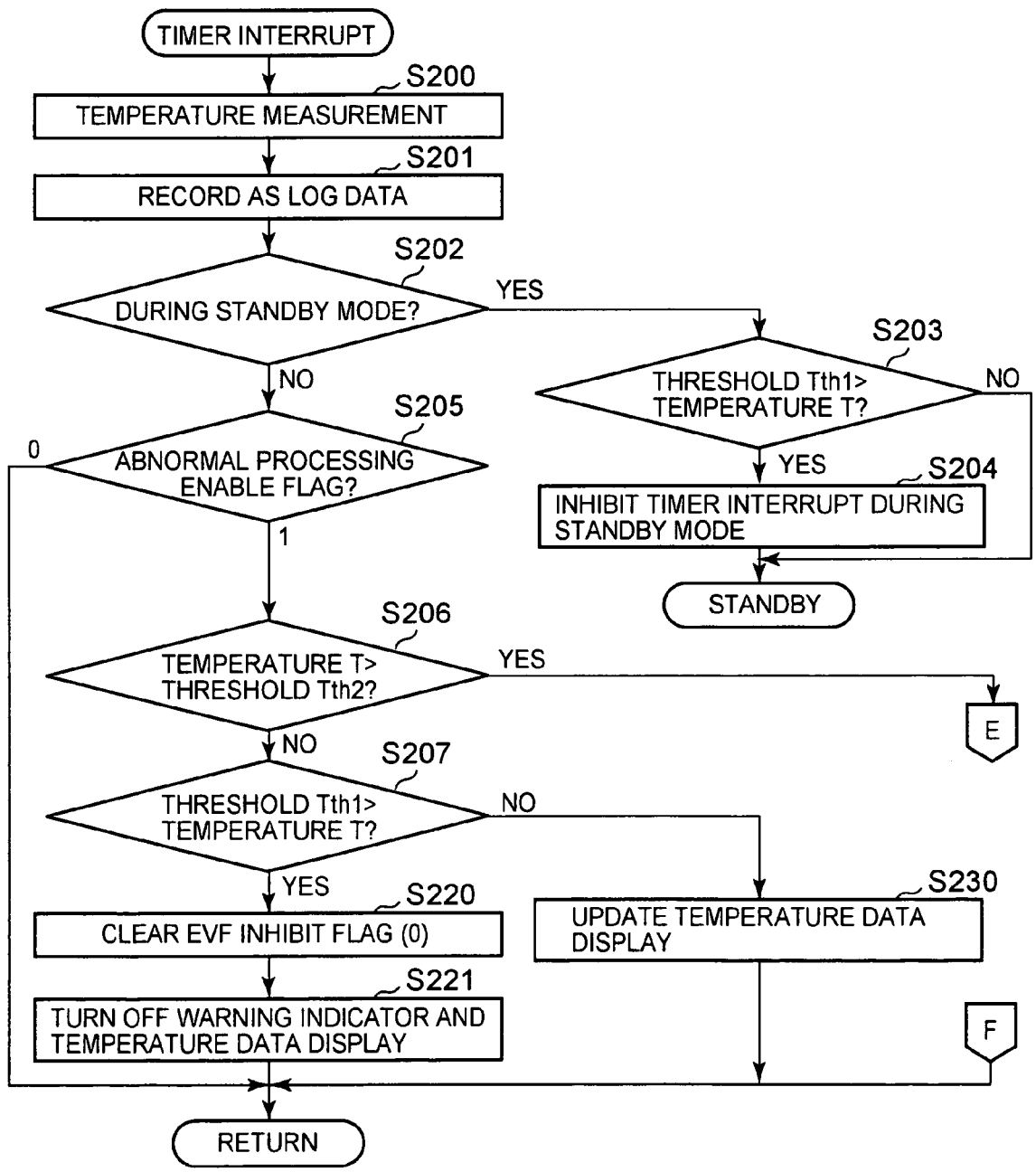
FIG. 6 is a flowchart of a timer interrupt routine according to the first embodiment of the present invention.
Figures 7, 8:
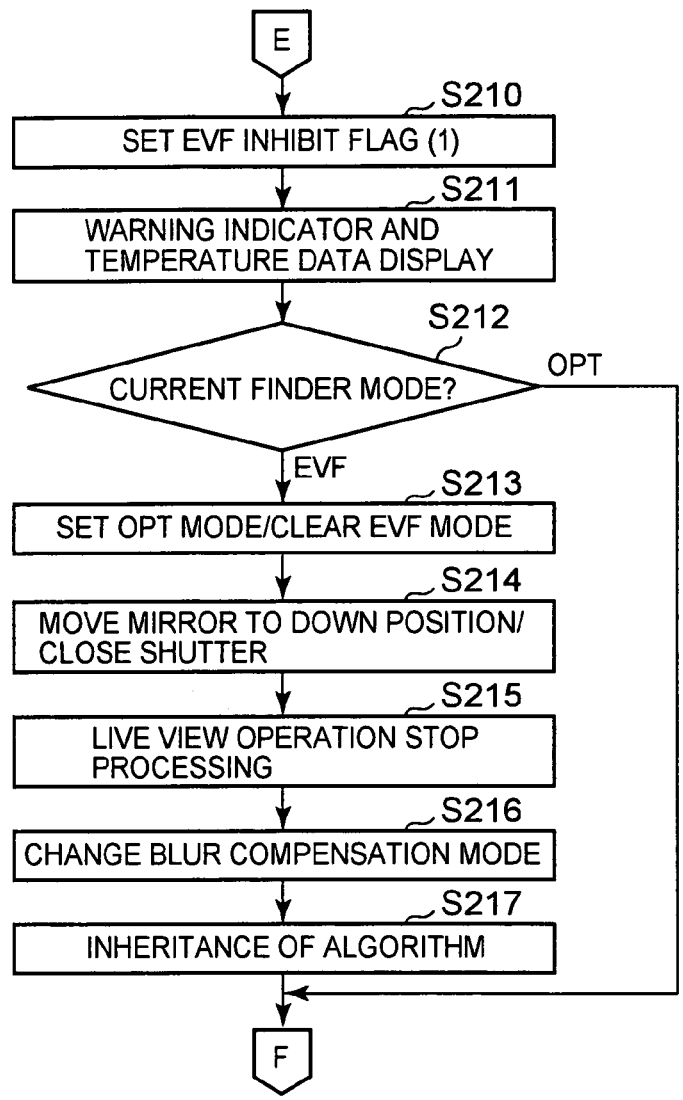
FIG. 7 is a flowchart of the timer interrupt routine according to the first embodiment of the present invention.
FIG. 8 is an exemplary table defining the relationship between shooting mode and temperature threshold parameter.

FIG. 1 is a block diagram showing the main structure of the single-lens reflex camera. FIGS. 2 to 5 are flowcharts of a main routine to be executed in the single-lens reflex camera. FIGS. 6 and 7 are flowcharts of a timer interrupt routine.

The single lens reflex camera of the embodiment will first be described.

A single-lens reflex camera 1 as an imaging apparatus of the embodiment consists principally of a camera body section 2 and a lens unit section 3 removable from the camera body. Although the single-lens reflex camera 1 according to the embodiment is a so-called lens interchangeable single-lens reflex camera, the present invention is not limited thereto, and the camera body section and the lens unit section can be integrally constructed.

The single-lens reflex camera 1 of the embodiment includes a focus lens 200 for forming a subject image, an image pickup device 130 arranged in coincidence with the focal plane of the focus lens 200 to photoelectrically convert the formed subject image and output it as an electrical image signal, and an LCD device 10 as a display device for displaying subject image data obtained by converting the image signal. The image pickup device 130 can be, for example, a CCD (Charge-Coupled Device), a CMOS (Complementary Metal Oxide Semiconductor), or any other type of image pickup device.

The single-lens reflex camera 1 also includes a quick return mirror 170 as optical path switching means arranged capable of entering or being retracted from the optical axis of the focus lens 200, a focal plane plate 161 arranged in such a position that when the quick return mirror 170 enters the optical axis, it becomes optically equivalent to the image pickup device 130, and a pentaprism 162 and eyepiece lens 163 as a finder optical system for viewing the subject image formed on the focal plane plate 161.

The single-lens reflex camera 1 of the embodiment having such a main structure as mentioned above has an optical finder mode (hereinafter referred to as "OPT mode") as a first finder mode for optical viewing of a subject image by means of the finder optical system, and an electronic viewfinder mode (hereinafter referred to as "The EVF mode") as a second finder mode for electronic viewing of a subject image in such a manner to provide, on LCD device 10, a live view display of image data from the image pickup device 130.

Upon shooting with the single-lens reflex camera 1, either of the above-mentioned OPT mode and EVF mode is selected. The LCD device 10 for live view display of a subject image in the EVF mode can be provided on the rear face of the camera body section 2 of the single-lens reflex camera 1, or at a distance from the eyepiece lens 163 to be optically equivalent to the focal plane plate 161. Switching between the EVF mode and the OPT mode is effected by a finder mode switching instruction part. The finder mode switching instruction part switches the finder mode according to user's operation. Alternatively, the finder mode switching instruction part can switch the finder mode according to a temperature rise in the image pickup device. The details will be described later.

The structure of the camera body section 2 of the single-lens reflex camera 1 will be described below.

The camera body section 2 consists principally of the above-mentioned quick return mirror 170 arranged behind a mount section on which the lens unit section 3 is mounted, a shutter 150 arranged behind the quick return mirror 170, the image pickup device 130, the finder optical system, a system controller 100 as control means, and the LCD device 10.

The system controller 100 as the control means for controlling the operation of the single-lens reflex camera 1 consists of a CPU 101 and a plurality of block circuits. The plurality of block circuits are divided by function into circuit blocks, such as an image processing circuit 103, a compression/decompression circuit 104, an external memory interface circuit 105, a general-purpose I/O circuit 106, an interrupt control circuit 107, a timer counter 108, an A/D converter 109, and a motion vector detection circuit 110.

The CPU 101 is electrically connected to each of the block circuits through a control line or bus line. The CPU 101 controls each of the block circuits according to a program code stored in a flash ROM 120. A power control circuit 102 controls power supply to each of the circuit blocks of the system controller 100 in accordance with instructions from the CPU 101.

The image pickup device 130 photoelectrically converts a subject image, formed by the focus lens 200 of the lens unit section 3 to be described in detail later, into an analog electric signal, and outputs the analog electric signal. An image pickup device interface circuit (hereinafter referred to as "image pickup device" IF circuit) 131 drives the image pickup device 130, converts the analog electric signal output from the image pickup device 130 into certain image data, and outputs the image data.

The image processing circuit 103 performs certain processing, such as γ correction, color conversion, and pixel conversion, on the image data output from the image pickup device 130, and outputs the processed image data.

The compression/decompression circuit 104 compresses the image data processed by the image processing circuit 103, and decompresses compressed image data input from the external memory interface circuit (hereinafter referred to as "external memory IF circuit") 105.

The motion vector detection circuit 110 is used to perform electronic blur compensation in the EVF mode of the single-lens reflex camera 1. In the EVF mode, image data is acquired from the image pickup device 130 at a predetermined frame rate. Here, the motion vector detection circuit 110 compares two image data adjacent to each other on the time axis to detect and output a motion vector in the image, i.e., the direction and velocity of camera shake (vibration) of the single-lens reflex camera 1. The motion vector detection is performed by this motion vector detection circuit 110 each time image data is acquired.

The CPU 101 changes the reading position on image data acquired by the image pickup device 130 according to the motion vector detected by this motion vector detection circuit 110 to generate image data for live view display on the LCD device 10. Thus, the subject image in the EVF mode is so displayed on the LCD device 10 that vibration of the single-lens reflex camera 1 is compensated for. The operation for correcting the reading position on this image data to compensate for the vibration of the single-lens reflex camera 1 is referred to as "electronic blur compensation" below. Note that a sensor for detecting the vibration of the single-lens reflex camera 1 can be provided instead of the motion vector detection circuit 110. A vibration gyroscope or the like can be used as this vibration detection sensor. In this case, the image pickup device can be displaced in a direction perpendicular to the photographing lens optical axis according to the output of the vibration gyroscope to perform electronic blur compensation. There is such a camera capable of performing blur compensation by this method. Such a method can be used to perform a second blur compensation operation.

The external memory IF circuit 105 has an interface function between data bus of the system controller 100 and a memory card 132, an SDRAM 133, and the flash ROM 120.

The general-purpose I/O circuit 106 is used as reading terminals of operating switches (hereinafter referred to as "operation SW") 134 electrically connected to the system controller 100, and as output terminals of control signals for controlling peripheral circuits.

The interrupt control circuit 107 generates an interrupt signal for the operation SW 134, an interrupt signal for the timer counter 108, etc. The timer counter 108 counts the number of clocks from a clock supply circuit, not shown, to generate a timing signal necessary for the system control. The clock supply circuit is a circuit for generating, from the output of an oscillator, a clock necessary for the operation of the system controller 100 and supplying the clock to each of the circuit blocks.

The A/D converter 109 is a circuit arranged in the single-lens reflex camera 1 to perform A/D conversion of an input signal from each of sensors such as a temperature sensor 140 and a light metering sensor electrically connected to the system controller 100. In other words, the A/D converter 109 and the temperature sensor 140 constitute a temperature detection circuit.

A power circuit 136 is a circuit for converting the voltage of a battery 137 as a rechargeable battery into a drive voltage necessary for the system controller 100 and the peripheral circuits and outputting the drive voltage. The power circuit 136 controls the electric power distribution in accordance with instructions from the system controller 100.

The flash ROM 120 stores a program code describing a control program for controlling the entire operation of the single-lens reflex camera 1, control parameters, log data of values of temperature T measured by the temperature sensor 140, etc.

The SDRAM 133 is used for temporary storage of image data output from the image pickup device IF circuit 131, as a working area for the system controller 100, and so on.

The system controller 100 thus configured reads and executes the control program stored in the flash ROM 120 to control the entire operation of the single-lens reflex camera 1.

The LCD device 10 as the display unit consists principally of a liquid crystal (LC) panel 11, a backlight 13, an LC panel drive circuit 12, and a backlight drive circuit 14. The LC panel drive circuit 12 is a circuit for driving the LC panel 11. The LC panel 11 displays various images, characters, icons, etc. in response to a driving signal from the LC panel drive circuit 12. Further, backlight drive circuit 14 is a circuit for driving an LED of the backlight 13 as an illumination element for illuminating the LC panel 11.

The memory card 132 is a recording medium removable from the single-lens reflex camera 1, including a semiconductor nonvolatile memory or a small hard disk drive.

A clock circuit (real-time clock) 138 is a circuit for generating date and time data (year, month, day, hour, minute, second) and outputting the date and time data to the system controller 100.

A USB controller 139 is a circuit for controlling exchange of data between the single-lens reflex camera 1 and external devices such as a personal computer or an external recording device electrically connected through a USB (Universal Serial Bus) terminal.

In the embodiment, the operation SW 134 consists of switches used to operate the single-lens reflex camera such as a two-step release SW, a mode setting. SW, a finder mode selecting SW, and a power supply SW, etc. The release SW is a two-step switch consisting of a 1st release SW and a 2nd release SW. The 1st release switch is turned on when the release SW is pressed halfway, while the 2nd release SW is turned on when the release SW is fully pressed.

The image pickup device 130 photoelectrically converts a subject image formed by the focus lens 200 into an analog electric signal, and outputs the analog electric signal. The image pickup device IF circuit 131 drives image pickup device 130, converts the analog electric signal output from the image pickup device 130 into predetermined image data, and outputs the image data.

The temperature sensor 140 and a thermometric circuit 141 are provided to detect the temperature T of the image pickup device 130. As the temperature sensor 140, for example, an element having such a characteristic that it varies a resistor value according to the temperature, or a semiconductor temperature sensor can be employed. Further, in order to measure the temperature of the image pickup device 130 more accurately, the semiconductor temperature sensor can be formed inside the circuit constituting the image pickup device 130.

The shutter 150 is arranged on the exposed image side of the image pickup device 130 to control shielding/exposure of the image pickup device 130 from/to light. A shutter drive mechanism 151 is a mechanism for opening/closing the shutter 150. Power to drive an actuator provided in the shutter drive mechanism 151 is supplied from a shutter & mirror drive circuit 153.

The quick return mirror 170 is optical path switching means capable of setting its position to either a DOWN position to guide an image, formed by the focus lens 200 in the optical path of the focus lens 200, to the focal plane plate 161, or an UP position retracted from the optical path of the focus lens 200 so as to guide the image formed by the focus lens 200 to the image pickup device.

The quick return mirror 170 is driven by a mirror drive mechanism 152. Power to drive an actuator provided in the mirror drive mechanism 152 is supplied from the shutter & mirror drive circuit 153.

A light metering circuit 164 includes a photodiode for measuring the brightness of the subject image through the optical finder. The light metering circuit 164 amplifies the output of the photodiode to output it to the system controller 100 as an electric signal corresponding to the brightness.

A semipermeable area is formed in a central portion of the quick return mirror 170 to transmit light at a predetermined ratio. When the quick return mirror 170 is at the DOWN position, part of a light beam from the focus lens 200, which has transmitted this semipermeable area, is reflected by a sub-mirror 171 and guided to an AF (Auto Focus) sensor 165. This AF sensor 165 is a known phase-difference AF sensor. The AF sensor 165 is controlled by a focus detection circuit 166.

The CPU 101 calculates a defocus amount, i.e., the amount of deviation between the position of the image formed by the focus lens 200 and the light-receiving surface of the image pickup device 130, based on the output of the focus detection circuit 166. This defocus amount is sent to a lens control microcomputer 208 provided in the lens unit section 3.

Next, the structure of the lens unit section 3 of the single-lens reflex camera 1 will be described. The lens unit section 3 of the single-lens reflex camera 1 according to the embodiment can perform optical blur compensation.

The lens unit section 3 consists principally of the focus lens 200, an aperture 202 for limiting the range of passage of the subject light beam to adjust the amount of light passing therethrough, a correction lens 204 for blur compensation, a vibration detection sensor 207, and the lens control microcomputer 208.

The lens unit section 3 is controlled by the lens control microcomputer 208. When the lens unit section 3 is mounted on the camera body section 2, the lens control microcomputer 208 and the system controller 100 are electrically connected through a communication line 180. Then, the lens control microcomputer 208 performs predetermined operations in accordance with instructions from the system controller 100. Further, power is supplied to the lens unit section 3 from the power circuit 136 through a power line, not shown.

The focus lens 200 is driven by a focus lens drive mechanism 201. The focus lens drive mechanism 200 includes an actuator for displacing the focus lens 200 entirely or partially.

The aperture 202 for limiting the amount of light beam from the focus lens 200 is driven by an aperture drive mechanism 203 including an actuator for driving the aperture 202.

The actuators of the focus lens drive mechanism 201 and the aperture drive mechanism 203 are driven by power from an actuator drive circuit 206, respectively. The lens control microcomputer 208 can set the position of the focus lens 200 and the aperture value to a predetermined value.

Further, the vibration detection sensor 207 detects camera shake (vibration) of the single lens reflex camera 1, i.e., of the lens unit section 3, and outputs an electric signal corresponding to the level of the vibration to the lens control microcomputer 208. A known small gyroscope is used as the vibration detection sensor 207.

The correction lens 204 that forms part of the optical system is arranged in the optical system of the lens unit section 3.

The correction lens 204 is arranged in such manner that it can displace on a plane orthogonal to the optical axis, and driven by a correction lens drive mechanism 205 including an actuator for displacing the correction lens 204. The actuator of the correction lens drive mechanism 205 is driven by power from the actuator drive circuit 206. The lens control microcomputer 208 can set the position of the correction lens 204 to a predetermined value through the actuator drive circuit 206.

The lens control microcomputer 208 displaces the correction lens 204 according to the output of the vibration detection sensor 207. This operation can make the image formed by the focus lens 200 rest on the focal plane plate 161 or the light-receiving surface of the image pickup device 130 even if vibration occurs to the lens unit section 3, i.e., to the single-lens reflex camera 1. Hereinafter, the operation for suppressing the subject image blur on the focal plane by displacing this optical system partially or entirely to compensate for the vibration of the single-lens reflex camera 1 is referred to as optical blur compensation (first blur compensation). Note that the vibration detection sensor 207 can be arranged in the camera body section 2, and the mechanism for implementing the optical blur compensation operation can also be arranged in the camera body section 2.

The following describes the basic operations of the single-lens reflex camera 1 having the above-mentioned structure in the OPT mode and the EVF mode, respectively.

In the OPT mode, the quick return mirror 170 is set to the DOWN position so that the image on the focal plane plate 161 is viewable through the optical finder composed of the pentaprism 162 and the eyepiece lens 163. Further, in the OPT mode, the subject brightness is calculated based on the output of the light metering circuit 164 to decide shooting conditions.

Then, in the OPT mode, the CPU 101 calculates the position of the image formed by the focus lens 200 and the defocus amount as the amount of deviation from the light-receiving surface of the image pickup device 130 based on the output of the focus detection circuit 166. This defocus amount is sent to the lens control microcomputer 208 provided in the lens unit section 3. Thus, the position of the focus lens 200 is controlled according to the defocus amount to perform focus adjustment in the single-lens reflex camera 1. In other words, in the OPT mode, the single-lens reflex camera 1 of the embodiment employs the phase-difference AF system.

Further, in the OPT mode, the optical blur compensation operation for displacing the correction lens 204 of the lens unit section 3 according to the output of the vibration detection sensor 207 to compensate for the vibration of the single-lens reflex camera 1 is employed.

On the other hand, in the EVF mode, the quick return mirror 170 is set to the UP position and the shutter 150 is opened so that the image formed by the image pickup device 130 is viewable on the LCD device 10 as live view display. Here, in the EVF mode, since the quick return mirror 170 is at the UP position, brightness measurement of the subject image by the light metering circuit 164 is disabled. Therefore, in the EVF mode, the CPU 101 calculates the subject brightness from the output of the image pickup device 130 to decide shooting conditions upon capturing image data of a still image.

In the EVF mode, phase-difference AF by the AF sensor 165 and the focus detection circuit 166 is disabled. Therefore, in the EVF mode, a so-called contrast detection AF system in which sharpness (contrast) in a certain area of the image data acquired from the image pickup device 130 is detected by the image processing circuit 103 to drive the focus lens 200 so that this sharpness will be the maximum is employed.

Further, in the EVF mode, the electronic blur compensation operation for correcting the reading position on the image data to compensate for the vibration of the single lens reflect camera 1 is employed. Here, according to the structure of the embodiment, the optical blur compensation operation is enabled in the EVF mode. However, since optical blur compensation involves a mechanical operation, it is not preferable to perform the optical blur compensation operation for a long time from power consumption standpoint and the like. Therefore, the single-lens reflex camera 1 of the embodiment employs the electronic blur compensation operation in the EVF mode.

As described above, the single-lens reflex camera 1 of the embodiment includes a finder mode switching instruction part switchable between the OPT mode and the EVF mode, a focusing part switchable between the phase-difference AF and the contrast detection AF, a brightness measurement part switchable between the light metering circuit 164 and the image pickup device 130, and blur compensation part switchable between the optical blur compensation operation and the electronic blur compensation operation.

In general, the image pickup device 130 generates more noise as temperature increases. In other words, as the temperature T of the image pickup device 130 rises, the image quality of the image acquired in the single-lens reflex camera 1 is degraded.

Therefore, in the single-lens reflex camera 1 of the embodiment, continuous imaging operation (The EVF mode) as one of the factors to increase the temperature of the image pickup device 130 is enabled only in a range less than a predetermined threshold (temperature threshold parameter Tth2) of the temperature T of the image pickup device 130 in order to prevent the degradation of the image quality resulting from the temperature rise in the image pickup device 130.

FIG. 8 shows an example of a table in which temperature threshold parameters Tth1 (first threshold) and Tth2 (second threshold) are defined. Further, FIG. 9 shows the general outline of control of the finder modes based on the temperature of the image pickup device 130.

The temperature threshold parameter Tth2 (second threshold) varies according to the shooting mode as shown in the table of FIG. 8, and defines the upper limit of the temperature T of the image pickup device 130 in the selected shooting mode as the upper limit value below which the influence of noise on the acquired image is acceptable. In other words, in the single-lens reflex camera 1 of the embodiment, if the temperature T of the image pickup device 130 is less than the temperature threshold parameter Tth2, it is deemed that the influence, on the acquired image, of noise generated by the image pickup device 130 can be practically eliminated.

Figure 9:
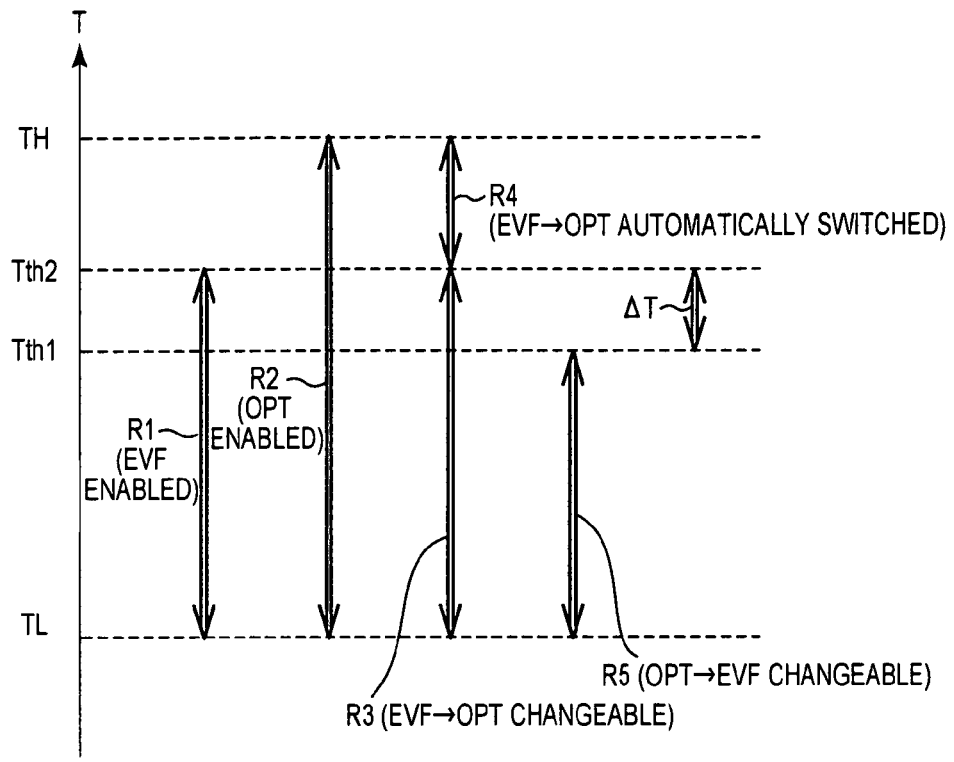
FIG. 9 is a diagram showing the general outline of control of finder modes based on the temperature of an image pickup device according to the first embodiment of the present invention.

As shown in FIG. 9, the shooting operation of the single-lens reflex camera 1 of the embodiment is enabled in an operable range of the image pickup device 130 between an upper-limit temperature TH and a lower-limit TL. Note that the temperature T of the image pickup device 130 is different from the operation guaranteed temperature of the single-lens reflex camera 1, i.e., the temperature of the environment where the single-lens reflex camera 1 is used. In general, the temperature T of the image pickup device 130 takes on values higher than the environmental temperature. For example, if the continuous imaging operation like in the EVF mode is performed, the temperature rises.

The EVF mode can be employed in a range from the lower-limit temperature TL to the temperature threshold parameter Tth2, in which the temperature T of the image pickup device 130 is considered to be able to operate the image pickup device 130 (R1 in FIG. 9). On the other hand, the OPT mode can be employed in a range from the lower-limit temperature TL to the upper-limit temperature TH, in which the temperature T of the image pickup device 130 is considered to be able to operate the image pickup device 130 (R2 in FIG. 9).

Further, in the EVF mode, if the temperature T of the image pickup device 130 becomes equal to or more than the temperature threshold parameter Tth2 (R4 in FIG. 9), abnormal processing for automatically changing the finder mode to the OPT mode is performed.

This abnormal processing is performed in interrupt processing to be described later. Specifically, in the abnormal processing, the quick return mirror 170 is moved to the DOWN position to make the shutter 150 enter the closed state and hence the image pickup device 130 stop acquiring image data.

Thus, in the single-lens reflex camera 1 of the embodiment, use of the EVF mode is inhibited in the range of more than temperature threshold parameter Tth2, and this makes it possible to keep the temperature T of the image pickup device 130 below the temperature threshold parameter Tth2 at the time of shooting. Therefore, according to the embodiment, the degradation of the image quality resulting from the temperature rise in the image pickup device 130 can be prevented.

Note that in the single-lens reflex camera 1 of the embodiment, the user can change the finder mode in a range defined between the temperature threshold parameters Tth2 and Tth1. The temperature threshold parameter Tth1 (first threshold) is a value varying according to the shooting mode as shown in the table of FIG. 8, and lower by value $\Delta T$ than Tth2.

Specifically, as shown in FIG. 9, the user of the single-lens reflex camera 1 can change the finder mode from the EVF mode to the OPT mode when the temperature T of the image pickup device 130 falls within an operable temperature range from the lower-limit temperature TL to the temperature threshold parameter Tth2 (R3 in FIG. 9). If the temperature T of the image pickup device 130 falls within the range from the temperature threshold parameter Tth2 to the upper-limit temperature TH (R4 in FIG. 9), the EVF mode is automatically switched to the OPT mode in the abnormal processing as mentioned above.

On the other hand, the user can change the finder mode from the OPT mode to the EVF mode when the temperature T of the image pickup device 130 falls within an operable temperature range from the lower-limit temperature TL to the temperature threshold parameter Tth1 (R5 in FIG. 9).

Here, difference $\Delta T$ between the temperature threshold parameters Tth2 and Tth1 is so set that when the temperature T of the image pickup device 130 is close to the temperature threshold parameter Tth2, the abnormal processing for automatically changing from the EVF mode to the OPT mode and the operator's manual processing for manually changing from the OPT mode to the EVF mode are prevented from being performed frequently in a short period of time. This makes it possible to prevent the system from being unstable due to highly frequent changes in the short period of time.

The following describes the temperature threshold parameters Tth1 and Tth2. In the embodiment, the temperature threshold parameters Tth1 and Tth2 are set based on the table stored in the flash ROM 120 as shown in FIG. 8.

As shown in FIG. 8, Tth2 is so set that Tth2 is always smaller by a predetermined value than Tth1 and the values of the temperature threshold parameters Tth1 and Tth2 become smaller as the image quality of an image to be recorded increases. The values of the temperature threshold parameters Tth1 and Tth2 vary depending on whether the shooting mode is still image shooting or moving image shooting, and upon the still image shooting, they vary depending on whether it is a night scene or daylight scene.

This is because the acceptable level of the influence of noise varies depending on the number of pixels of the image data to be finally recorded, the compression ratio, and the like, in the actual operation of the single-lens reflex camera 1.

For example, as the number of pixels to be recorded increases or if the compression ratio is reduced, the influence of noise increases. Further, when a night scene whose exposure time is long is taken, the influence of noise due to dark current of the image pickup device 130 becomes larger than when a daylight scene is taken. Further, the influence of noise on a still image is larger than that on a moving image.

During moving image shooting (where the EVF mode is selected), the image pickup device is continuously driven. As a result, during moving image shooting, the temperature of the image pickup device is likely to rise. If the temperature of the image pickup device exceeds the temperature parameter Tth2 during moving image shooting, the finder mode has to be changed from the EVF mode to the OPT mode. However, this operation interrupt the moving image shooting regardless of the user's intention. To prevent this situation, the temperature parameter Tth2 has only to be set higher. The acceptable noise level varies depending on the shooting mode (the number of pixels, the image compression ratio, the shooting scene, and whether it is a still image or a moving image). It is therefore preferable to set the temperature parameters according to the shooting mode.

Thus, as the shooting mode is susceptible to the influence of noise, the temperature T of the image pickup device 130 needs to be kept lower. For this reason, the values of the temperature threshold parameters Tth1 and Tth2 are set smaller as the shooting mode is susceptible to the influence of noise.

The corresponding table between the shooting mode and the temperature threshold parameters Tth1 and Tth2 is stored as part of the control parameters stored in the flash ROM 120 in the manufacturing process of the single-lens reflex camera 1, but these parameters can be set according to user's preferences. In this case, the user can operate a predetermined operation SW to enter the table.

The following describes a main routine executed by the CPU 101 of the system controller 100 in the single-lens reflex camera 1 of the embodiment having the above-mentioned structure with reference to FIGS. 2 to 5.

There are two start processes: a process to start the system of the single lens reflex camera 1 by pressing the power SW during power-off state, and a process to start the system of the single lens reflex camera 1 from a standby mode.

If the power SW is turned on by the operator during the power-off state, the system controller 100 starts its operation, and in step S100, it performs system initialization, such as memory initialization, IO initialization, circuit block initialization, etc.

On the other hand, if the operator operates any operation SW 134 in the standby mode, the system controller 100 performs initialization in step S101 upon starting from the standby mode. The details of the standby mode of the single lens reflex camera 1 of the embodiment will be described later.

Next, in step S102, the timer counter 108 is set. The timing signal output from the timer counter 108 is generated every predetermined time, e.g., every one second. This timing signal triggers timer interrupt processing the details of which will be described later with reference to FIGS. 6 and 7. The timing signal is also used in the shooting operation of the single-lens reflex camera 1.

Next, in step S110, it is determined whether the mode setting SW in the operation SW 134 is operated or not. Here, the mode setting SW is a switch for setting the shooting mode of the single-lens reflex camera. Further, the shooting mode setting means that the user can select an option such as image quality of an image to be shot, scene setting to be shot, switching between moving image shooting and still image shooting, switching between continuous shooting and single image shooting, etc. If the mode setting SW is operated, the procedure goes to step S111, while the mode setting SW is not operated, the procedure shift to step S113.

If it is determined in step S110 that the mode setting SW is operated, the shooting conditions such as the image quality, the exposure program, and the shooting sensitivity are set in step S111 according to the shooting mode set by the user.

Next, in step S112, the two temperature threshold parameters Tth1 and Tth2 corresponding to the set shooting mode are read from the flash ROM 120 to set the read parameters. After the threshold values Tth1 and Tth2 are set and stored, the procedure returns to the top of the operation loop of the main routine, i.e., to step S110.

On the other hand, if it is determined in step S110 that the mode setting SW is not operated, it is then determined in step S113 whether the finder mode selecting SW in the operation SW 134 is operated or not. Here, the finder mode selecting SW is a switch for allowing the user to select a finder mode for viewing a subject in the single-lens reflex camera 1. As mentioned above, in the embodiment, either the OPT mode for viewing the subject using the optical finder or the EVF mode for using the LCD device 10 to view image data of the subject acquired by the image pickup device is selected as the finder mode. If it is determined that the finder mode selecting SW is operated, the procedure proceeds to step S114, while if it is determined that the finder mode selecting SW is not operated, the procedure shifts to step S130.

If it is determined in step S113 that the finder mode selecting SW is operated, it is then determined in step S114 whether the current finder mode is the OPT mode as the first finder mode or the EVF mode as the second finder mode. If it is determined in step S114 that the current finder mode is the OPT mode, the procedure proceeds to step S115, while if it is determined that the current finder mode is the EVF mode, the procedure shifts to step S121.

If it is determined in step S114 that the current finder mode is the OPT mode, the state of an EVF inhibit flag is next determined in step S115. Here, the EVF inhibit flag is one of the control parameters, and if this value is "1," changing the finder mode (from OPT mode to The EVF mode) is inhibited. This EVF inhibit flag is set in the timer interrupt processing to be described later.

If it is determined in step S115 that the EVF inhibit flag is "1," the procedure shifts to step S130. On the other hand, if it is determined in step S115 that the EVF inhibit flag is "0," the procedure proceeds to step S116.

In step S116, the finder mode is set to the EVF mode to end the OPT mode. Next, in step S117, the quick return mirror is moved from the DOWN position to the UP position to guide the image formed by the focus lens 200 to the image pickup device 130, and further the shutter 150 is brought to the open state.

Next, in step 118, image data are captured from the image pickup device 130, and settings of the image pickup device IF circuit 131, the image processing circuit 103, the LC panel drive circuit 12, the backlight drive circuit 14, etc. are performed to display the image data on the LCD device 10. Thus, the single-lens reflex camera 1 becomes such a state to allow the user to view the subject image on the LCD device 10, i.e., it enters the EVF mode.

Next, in step S119, the blur compensation mode is changed. Specifically, the blur compensation mode is changed from the optical blur compensation to the electronic blur compensation in accordance with the change in the finder mode from the OPT mode to the EVF mode. As mentioned above, since the electronic blur compensation operation does not involve any mechanical operation, the electronic blur compensation operation can achieve power savings and hence can be continued for a longer period of time than the optical blur compensation operation.

Next, in step S120, inheritance operations of shooting algorithms are carried out. In the single-lens reflex camera 1 of the embodiment, the brightness and color of the subject and the like are detected, and based on the detection results, shooting conditions are so calculated that a subject image can be acquired on the optimum conditions. The shooting conditions include shutter speed, aperture value, $\gamma$ correction, and color conversion conditions. To be more specific, brightness information and color information are acquired at predetermined plural positions within a shooting area (field of view), and based on the plural pieces of information, the CPU 101 executes a certain AE (Auto Exposure) algorithm to decide the shooting conditions.

Here, as mentioned above, the single-lens reflex camera 1 of the embodiment has different light metering means for measuring subject brightness and the like and different focusing means for focusing on the subject between the OPT mode and the EVF mode. Therefore, different AE algorithm and AF algorithm are used between the OPT mode and the EVF mode to decide the shooting conditions, respectively.

Thus, when switching is performed between the OPT mode and the EVF mode, parameters are delivered between both algorithms to prevent the shooting conditions obtained by both AE algorithms for the same subject from differing therebetween.

Similarly, this condition should be fulfilled in the AF operation. In other words, when switching is performed between the OPT mode and the EVF mode, parameters are delivered between both algorithms to prevent both in-focus positions of the same subject from differing therebetween. The above is the inheritance operations of the shooting algorithms executed in step S120. After completion of the inheritance operations of the shooting algorithms, the procedure returns to S110.

On the other hand, if it is determined in step S114 that the current finder mode is the EVF mode, the finder mode is set to the OPT mode in step S121 to end the EVF mode. Next, in step S122, the quick return mirror 170 is moved from the UP position to the DOWN position to guide the subject image formed by the focus lens 200 to the optical finder, and further the shutter 150 is brought to the closed state.

Next, in step S123, the live view operation for displaying image data from the image pickup device 130 on the LCD device 10 is stopped. Next, in step S124, the blur compensation mode is changed from the electronic blur compensation operation to the optical blur compensation operation. Then, in step S125, the above-mentioned inheritance operations of the shooting algorithms are performed, where the parameters are so delivered that the results of the AE algorithm and AF algorithm in the EVF mode match the results of the AE algorithm and AF algorithm in the OPT mode. Then, the procedure returns to S110.

If it is determined in step S113 that the finder mode selecting SW is not operated, or if it is determined in step S115 that the EVF inhibit flag is "0," it is next determined in step S130 whether the 1st release SW in ON-state or not. In other words, it is determined whether the release SW has been pressed halfway. If the 1st release SW is ON-state, the procedure shifts to step S131, while if it is not ON-state, the procedure shifts to step S170.

Note that a sequence of operation steps S131 to S143 to be described below are directed to such a case that the release SW has been pressed halfway, i.e., the 1st release SW is ON-state.

If it is determined in step S130 that the 1st release SW is ON-state, it is next determined in step S131 whether the current finder mode is the OPT mode or the EVF mode. If it is determined in step S131 that the current finder mode is the EVF mode, the procedure proceeds to step S132, while if it is the OPT mode, the procedure shifts to step S138.

If it is determined in step S131 that the current finder mode is the EVF mode, an abnormal processing enable flag as one of the control parameters is cleared in step S132 to set the flag value to "0."

When the temperature T of the image pickup device 130 becomes equal to or more than the temperature threshold parameter Tth2, the finder mode is changed from the EVF mode to the OPT mode. In other words, the finder mode switching instruction part is controlled to perform this switching operation. This switching operation means the abnormal processing. When the abnormal processing enable flag is set to "1," the abnormal processing is enabled, while when it is set to "0," the abnormal processing is inhibited.

The reason whey the abnormal processing enable flag is set to "0" in step S131, i.e., the execution of the abnormal processing is inhibited, is to complete the contrast detection AF, performed using the output of the image pickup device 130 in the EVF mode on condition that the 1st release SW is ON-state, and the decision of the shooting conditions (AE).

Next, the contrast detection AF is performed in steps S133 to S135. Specifically, in step S133, contrast information at a plurality of measurement points is acquired from the image data output from the image pickup device 130. Then, one of the plurality of measurement points is selected according to the AF algorithm. The AF algorithm finds a measurement point, for example, by detecting the features of a human face from the image data.

Next, in steps S134 and S135, the position of the photographing lens is so displaced that the contrast at the selected measurement point becomes the maximum. Then, when the contrast becomes the maximum and hence it is determined that the point is in focus, the procedure proceeds to step S136.

Next, in step S136, brightness information at the plurality of measurement points is acquired from the image data output from the image pickup device 130. Then, the shooting conditions (shutter speed and aperture value) are decided based on the AE algorithm. Next, in step S137, the value of the abnormal processing enable flag is set to "1" and the procedure shifts to step S144.

By going through the above-mentioned steps S133 to S136, the subject is focused and the shooting conditions are decided. In other words, the shooting operation becomes possible whenever the 2nd release SW is turned on.

On the other hand, if it is determined in step S131 that the current finder mode is the OPT mode, the phase-difference AF operation is next performed in steps S138 to S142. Here, the AF sensor 165 is caused to perform data accumulation, and the accumulated data is read from the AF sensor 165 to determine the defocus amount. If this defocus amount is equal to or less than a predetermined value, i.e., if it becomes the in-focus state, the AF operation is ended and the procedure proceeds to step S143. If the defocus amount is more than the predetermined value, the defocus amount is sent to the lens control microcomputer 208. Then, the focus lens 200 is driven in step S142 according to the defocus amount.

Next, in S143, brightness data is acquired from the light metering circuit 164. Then, the shooting conditions are decided based on the AE algorithm and the procedure proceeds to step S144.

By going through the above-mentioned steps S138 to S143, the subject is focused and the shooting conditions are decided. In other words, the shooting operation becomes possible whenever the 2nd release SW is turned on.

After completion of the above-mentioned operation steps S131 to S141 where the release SW has been pressed halfway, it is determined in step S144 whether the 2nd release SW is ON-state or not. In other words, it is determined whether the release SW has been fully pressed or not. If the 2nd release SW is ON-state, the procedure proceeds to step S150, while if it is not ON-state, the procedure proceeds to step S145.

If it is determined in step S144 that the 2nd release SW is not ON-state, the state of the 1st release SW is next determined in step S145. Here, if the 1st release SW is ON-state, since it means that the release SW remains pressed halfway, the procedure returns to step S144. On the other hand, if the 1st release SW is OFF-state, since it is considered that the user has interrupted the operation of the release SW, the procedure returns to step S110.

If it is determined in step S144 that the 2nd release SW is ON-state, the value of the abnormal processing enable flag is set to "0" in step S150. This is to inhibit the execution of the abnormal processing during the following processing steps. Then, the procedure proceeds to step S151. Note that a sequence of operation steps S151 to S165 to be described below are directed to such a case that the release SW has been fully pressed, i.e., the 2nd release SW is ON-state.

Next, in step S151, it is determined whether the current finder mode is the OPT mode or the EVF mode. If it is determined in step S151 that the current finder mode is the EVF mode, the procedure proceeds to step S152, while if it is the OPT mode, the procedure proceeds to S154.

If it is determined in step S151 that the current finder mode is the EVF mode, processing for stopping the live view operation on the LCD device 10 is next performed in step S152. In other words, the operation of the circuits necessary to display image data from the image pickup device 130 on the LCD device 10 is stopped, and then the shutter 150 is brought to the closed state. Next, in step S153, the operation of the circuits associated with the electronic blur compensation are stopped. Next, the procedure proceeds to step S156.

On the other hand, if it is determined in step S151 that the current finder mode is the OPT mode, the quick return mirror 170 is moved from the DOWN position to the UP position in step S154. Next, in step S155, the optical blur compensation operation is stopped, the lens control microcomputer 208 is instructed to perform centering of the correction-lens 204. Upon receipt of the centering instruction, the lens control microcomputer 208 moves the correction lens 204 to the center of the moving range. Next, the procedure proceeds to step S156.

In step S156, the lens control microcomputer 208 is instructed to start the blur compensation operation to perform the optical blur compensation operation during exposure to the image pickup device 130. Next, in step S157, the aperture 202 and the shutter 150 are controlled according to the aperture value and shutter speed as the shooting conditions already determined to expose the image pickup device 130. As a result, image data to be shot is acquired.

Next, in step S158, the lens control microcomputer 208 is instructed to stop the optical blur compensation operation and perform centering of the correction lens 204.

In step S159, image processing such as γ correction and color conversion is performed on the image data output from the image pickup device 130 on the decided conditions. Further, the number of pixels is changed according to the operation mode, and a compressed image file is created. The image file is stored in the memory card 132.

Next, in step S160, it is determined whether the current finder mode is the OPT mode or the EVF mode. If it is determined in step S160 that the current finder mode is the EVF mode, the procedure proceeds to step S161, while if it is the OPT mode, the procedure proceeds to step S163.

If it is determined in step S160 that the current finder mode is the EVF mode, the EVF mode is started in the next step S161, i.e., processing for starting the live view operation on the LCD device 10 is performed. Then, the shutter 150 is brought to the open state, and the operation of the circuits necessary to display the image data from the image pickup device 130 on the LCD device 10 is started.

Next, in step S162, the operation of the circuits associated with the electronic blur compensation is started to start the electronic blur compensation operation. Then, the procedure proceeds to step S165.

On the other hand, if it is determined in step S160 that the current finder mode is the OPT mode, the quick return mirror is moved to the DOWN position in step S163 to start the OPT mode. Next, in step S164, the lens control microcomputer 208 is instructed to start the optical blur compensation operation in order to start the optical blur compensation. Then, the procedure proceeds to step S165.

In step S165, the value of the abnormal processing enable flag is set to "1" and the procedure returns to step S110. The above is the shooting processing to be performed when the release SW of the single-lens reflex camera 1 has been fully pressed.

On the other hand, if it is determined in step S130 that the 1st release SW is not ON-state, it is next determined in step S170 whether a predetermined period of time has elapsed since the last operation of the operation SW 134. If it is determined in step S170 that the predetermined period of time has elapsed since the last operation of the operation SW 134, the procedure proceeds to step S171 to perform processing for shifting to the standby mode. The standby mode means such a state that all but minimally necessary circuit blocks are stopped in order to reduce the power consumption of the single-lens reflex camera.

Next, in step S171, if the operation SW 134 is operated during the standby mode, an interrupt signal is generated to activate the CPU 101. This is to clear the standby mode and start the main routine whenever the operation SW 134 is operated.

Next, in step S172, it is determined whether the current temperature T of the image pickup device 130 is lower than the temperature threshold parameter Tth1 or not. The data on the temperature T is stored as log data in the flash ROM 120. If the current temperature T of the image pickup device 130 is lower than the temperature threshold parameter Tth1, the procedure proceeds to step S174 to perform processing for shifting to the standby mode.

On the other hand, if the current temperature T of the image pickup device 130 is equal to or higher than the temperature threshold parameter Tth1, the procedure proceeds to step S173 to measure the temperature T of the image pickup device 130 even during the standby mode. In step S173, timer interrupt during the standby mode is enabled to shift to the standby mode. Since the image pickup device 130 is not driven during the standby mode, the temperature T is dropped.

The reason why the measurement of the temperature T of the image pickup device 130 is continued is to enable a determination on whether the EVF mode is selectable or not immediately after clearing the standby mode. Note that the cycle of the timer interrupt during the standby mode may be longer than the cycle during the normal operation. This is because the temperature T of the image pickup device 130 that is not driven during the standby mode does not rise.

On the other hand, if it is determined in step S170 that the predetermined period of time has not elapsed since the last operation of the operation SW 134, the procedure shifts to step S180. In step S180, it is determined whether the power SW as one of the operation SW is OFF-state or not. Here, if the power SW is not OFF-state, i.e., if it is ON-state, the procedure returns to step S110 to continue the main routine.

In step S180, if the power SW as one of the operation SW is OFF-state, it is then determined in step S181 whether the current finder mode is the OPT mode or the EVF mode.

If it is determined in step S181 that the current finder mode is the EVF mode, the procedure proceeds to step S182 to move the quick return mirror 170 from the UP position to the DOWN position. Then, the shutter 150 is brought to the closed state. After that, the procedure proceeds to step S183 to stop the operation of all the circuits in the single-lens reflex camera 1 in order to terminate the system.

On the other hand, if it is determined in step S181 that the current finder mode is the OPT mode, since the processing step S182 is not needed, the procedure proceeds to step S183 to stop the operation of all the circuits in the single-lens reflex camera 1 in order to terminate the system.

The above is the main routine processing to be executed in the single-lens reflex camera 1 of the embodiment.

Next, timer interrupt processing performed by the system controller 100 in response to a timer interrupt will be described with reference to FIGS. 6 and 7. As mentioned above, a timing signal output from the timer counter 108 every predetermined cycle triggers the timer interrupt processing.

First, in step S200, the output of thermometric circuit 141 is AD converted to measure the temperature T of the image pickup device 130. Next, in step S201, the measurement result of the temperature T is written to the temperature log data stored in the flash ROM 120 together with the time at which the measurement operation was performed to update the temperature log data. The time at which the measurement operation was performed is acquired from the clock circuit 138.

Next, in step S202, it is determined whether the single-lens reflex camera 1 is in the standby mode or not at present. If it is in the standby mode, the procedure proceeds to step S203, while if it is in the normal operation, the procedure proceeds to step S205.

If it is determined in step S202 that the single-lens reflex camera 1 is in the standby mode, it is then determined in step S203 whether the current temperature T of the image pickup device 130 is lower than the temperature threshold parameter Tth1. If the current temperature T of the image pickup device 130 is lower than the temperature threshold parameter Tth1, the procedure proceeds to step S204 to inhibit the execution of the timer interrupt processing during the standby mode, and then the single less reflex camera 1 enters the standby mode. The reason why the timer interrupt processing is inhibited during the standby mode is that the temperature T of the image pickup device 130 is low enough and there is no need to measure the temperature T.

On the other hand, if it is determined in step S203 that the current temperature T of the image pickup device 130 is equal to or higher than the temperature threshold parameter Tth1, since it means that the temperature T needs to be continuously measured, the single lens reflex camera 1 enters the standby mode without inhibiting the interrupt.

On the other hand, if it is determined in step S202 that the single-lens reflex camera 1 is currently in the normal operation, the state of the abnormal processing enable flag is next determined in step S205. Here, if the value of the abnormal processing enable flag is "0," the procedure returns from the interrupt routine to the main routine. In other words, only the temperature T is measured in the timer interrupt processing in this case. This is to avoid the influence of the timer interrupt processing on the shooting preparation operations and the shooting operation of the single-lens reflex camera 1.

For example, the shooting preparation operations in the EVF mode include the focusing operation (AF operation), the light metering operation (AE operation), and the like. Therefore, if the finder mode is switched from the EVF mode to the OPT mode during these shooting preparation operations, the shooting preparation operations are terminated even during the shooting preparation operations. In this case, the shooting preparation operations need to be performed again after the finder mode is switched to the OPT mode. Thus, if the finder mode is changed during the shooting preparation operations, the release time lag increases and hence the user could miss his or her intended shooting timing. For this reason, the abnormal processing enable flag is set to "0" during the shooting preparation operations.

If it is determined in step S205 that the value of the abnormal processing enable flag is "1," the procedure proceeds to step S206.

In steps S206 and S207, the measured temperature T of the image pickup device 130 is compared with the temperature threshold parameter Tth1 and Tth2 as predetermined threshold values, respectively. Here, if the temperature T of the image pickup device 130 satisfies $Tth2 \geq T \geq Tth1$, the procedure proceeds to step S230. If the temperature T of the image pickup device 130 satisfies Tth1>T, the procedure proceeds to step S220. If the temperature T of the image pickup device 130 satisfies T>Tth2, the procedure proceeds to step S210.

In step S210, the value of the EVF inhibit flag is set to "1." As a result, changing the finder mode from the OPT mode to the EVF mode is inhibited. This inhibited state is kept until the temperature of the image pickup device 130 becomes less than the temperature threshold parameter Tth1.

Figure 10:
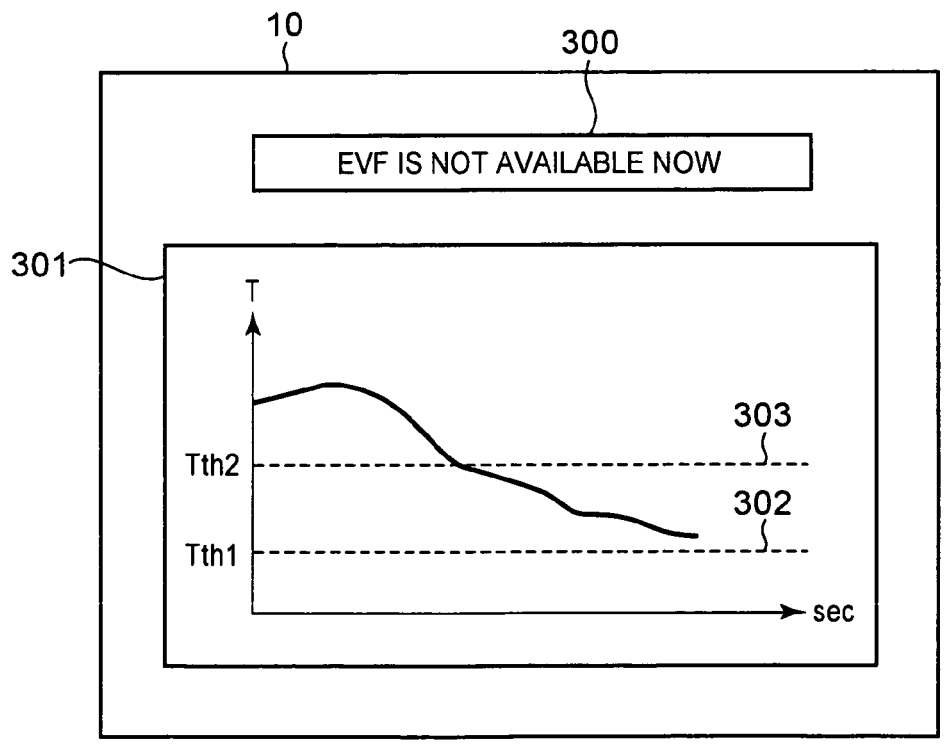
FIG. 10 is a diagram showing a display example of a warning upon inhibiting an EVF mode according to the first embodiment of the present invention.

Next, in step S211, a warning indicator and temperature data as shown in FIG. 10 are displayed on the LCD device 10. This display is to notify the user that the temperature T of the image pickup device 130 is too high to use the EVF mode.

Here, on the LCD device 10, a graph 301 with time on the abscissa and representing serial changes in measurement results of the temperature T over time is shown together with the warning indicator 300. This display is maintained until the EVF mode becomes selectable and the graph 301 is updated each time the temperature T is measured. Further, broken lines indicative of the temperature threshold parameters Tth1 and Tth2 respectively are drawn on the graph 301.

The user can view the graph 301 displayed on the LCD device 10 and updated time to time to predict the time until the EVF mode becomes available.

Next, in step S212, it is determined whether the current finder mode is the OPT mode or the EVF mode. If it is determined in step S212 that the current finder mode is the OPT mode, the procedure returns to the main routine.

On the other hand, if it is determined in step S212 that the current finder mode is the EVF mode, the procedure proceeds to step S213 to set the finder mode to the OPT mode and end the EVF mode. Next, in step S214, the quick return mirror is moved from the UP position to the DOWN position, and further the shutter 150 is brought to the closed state.

Next, in step S215, the live view operation for displaying image data from the image pickup device 130 on the LCD device 10 is stopped. Next, in step S216, the blur compensation mode is changed from the electronic blur compensation operation to the optical blur compensation operation. Then, in step S217, the inheritance operations of the shooting algorithms are performed, where the parameters are so delivered that the results of the AE algorithm and AF algorithm in the EVF mode match the results of the AE algorithm and AF algorithm in the OPT mode. Then, the procedure returns to the main routine.

In step S220, the value of the EVF inhibit flag is set to "0." Since the EVF inhibit flag is cleared, processing for changing the finder mode from the OPT mode to the EVF mode is enabled.

Next, in S221, the warning indicator 300 and the graph 301 displayed on the LCD device 10 as shown in FIG. 10 are turned off. Then, the procedure returns to the main routine. After returning to the main routine, information such as the camera operating mode, exposure condition data (aperture value and shutter speed) calculated based on the output from the light metering circuit, the number of shot frames, etc. is displayed on the LCD device. Further, since the warning indicator 300 and the graph 301 on the LCD device 10 disappear, the user can know that the finder mode is changeable.

In step S230, the display of the graph 300 on the LCD device 10 is updated in such a manner to add new measured data, and the procedure returns to the main routine.

The above is the timer interrupt processing to be executed in the single-lens reflex camera 1 of the embodiment.

In the embodiment, although the temperature data is displayed only during display of warning indicating that the temperature T of the image pickup device 130 is too high to use the EVF mode, the temperature data can always be displayed for user's convenience. In this case, if both the subject image and the temperature data are displayed on the LCD device 10 in the EVF mode in a superimposed manner, since the superimposed display makes it hard to view the subject image, the operation for displaying the temperature data during time periods other than that of warning display can be made selectable by the user.

Further, in the embodiment, switching between the EVF mode and the OPT mode is effected based only on the measurement results of the temperature T of the image pickup device 130, but the temperature of, for example, any other semiconductor element that is arranged in the single-lens reflex camera 1 and is likely to rise its temperature can also be considered.

Further, since the temperature distribution of the image pickup device 130 is not always uniform, a plurality of temperature sensors 140 can be provided to measure the temperature T of the image pickup device 130 so that plural pieces of temperature data obtained from these sensors can be considered to control switching between the EVF mode and the OPT mode.

Depending on the situation in which the single-lens reflex camera 1 as the imaging apparatus is used, such a case is considered that shooting in the EVF mode is preferred despite the large influence of noise on the image to be acquired. The automatic change of the finder mode can also interfere with the user's shooting operation.

In the aforementioned embodiment, use of the EVF mode is inhibited only when the temperature T of the image pickup device 130 is equal to or more than the temperature threshold parameter Tth2 to place priority on the image quality. However, the single lens reflex camera 1 has, of course, an operation mode capable of stopping the above-mentioned camera control to place priority on the immediacy of the shooting operation.

Further, although the embodiment focuses only on the high-temperature side of the temperature T of the image pickup device 130, if image pickup device has such a characteristic that the image signal output therefrom is degraded on the low-temperature side, a threshold value on the low-temperature side can be provided in the same manner as in the embodiment.

In the embodiment, the two temperature parameter Tth2 and Tth1 are used to prevent switching between the EVF mode and the OPT mode from becoming destabilized. However, there can be considered a method in which only the temperature parameter Tth2 is used to prevent the switching from becoming destabilized. In this method, if the temperature of the image pickup device rises and exceeds Tth2, the finder mode is also switched from the EVF mode to the OPT mode. Then, switching of the finder mode is inhibited for a predetermined period of time ($\Delta T$). $\Delta T$ is decided in consideration of the rate of temperature drop of the image pickup device. If such a time parameter ($\Delta T$) is set, the single temperature parameter can be used to implement the features of the embodiment.

Second Embodiment

A second embodiment of the present invention will be described with reference to FIGS. 11 to 18. The single-lens reflex camera of the embodiment differs from the first embodiment in means for measuring the noise level of the image pickup device. Therefore, the following describes only this different point. The same portions as those in the first embodiment are given the same reference numerals to omit redundant description.

In the aforementioned first embodiment, the temperature T of the image pickup device 130 is measured to indirectly calculate the level of noise present in the image pickup device 130 from the predetermined relationship between temperature T and noise level. Then, based on this calculated noise level, switching between the OPT mode and the EVF mode is controlled.

On the other hand, in the embodiment, an optical black pixel (hereinafter referred to as "OB pixel") shielded from light are formed in the image pickup device 130 in addition to the pixels to acquire image data, and based on dark current as the output of the OB pixel, the noise level of the image pickup device 130 is determined. In other words, in the embodiment, dark noise or a fixed-pattern noise (hereinafter-abbreviated as "FPN") of the OB pixel is measured as a value representing the noise level of each pixel of the image pickup device 130. Then, based on the determined noise level, switching between the OPT mode and the EVF mode is controlled.

Figure 11:
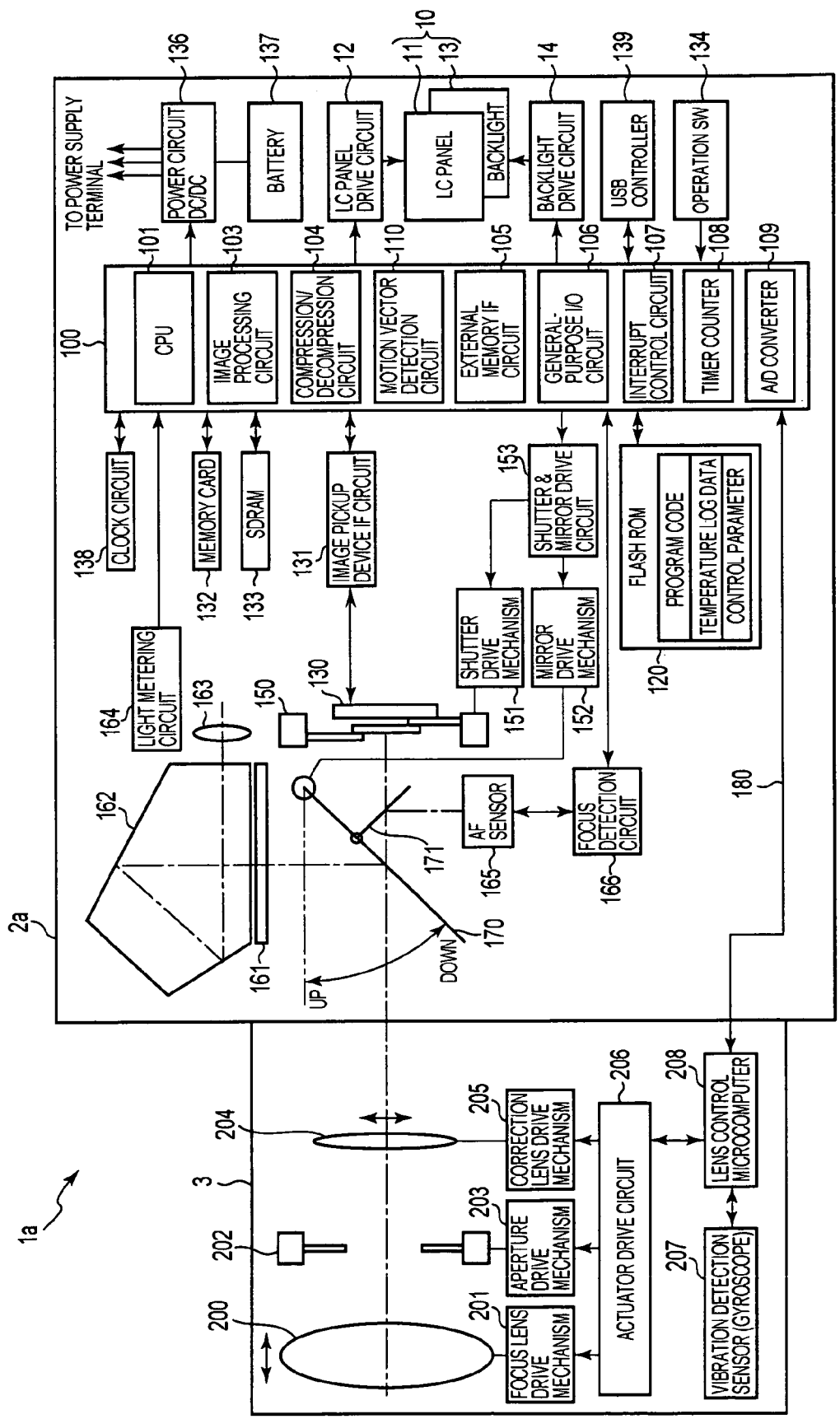
FIG. 11 is a block diagram showing the main structure of a single lens reflect camera according to a second embodiment of the present invention.
Figure 12:
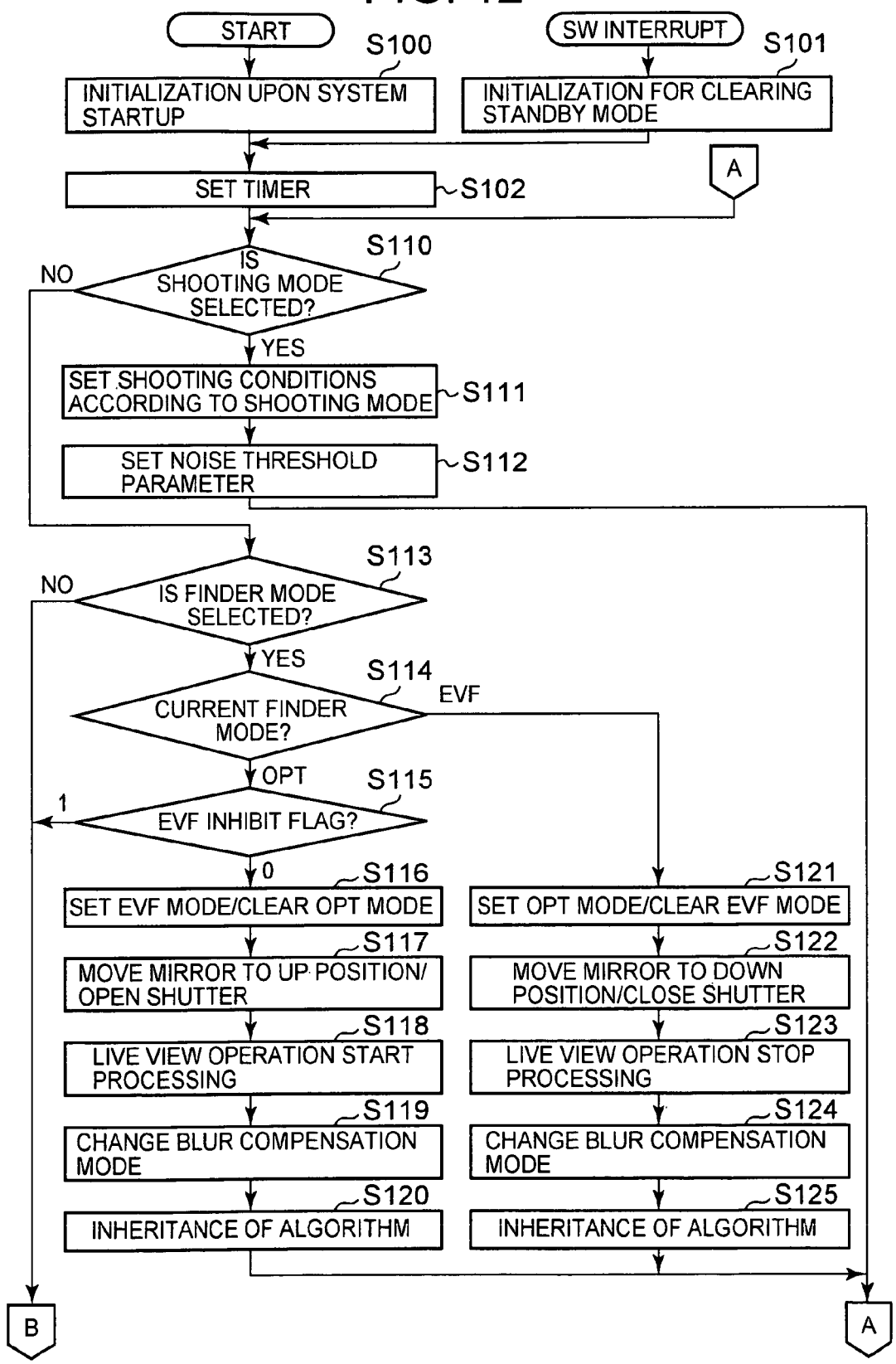
FIG. 12 is a flowchart of a main routine executed in the single lens reflect camera according to the second embodiment of the present invention.

As shown in FIG. 11, a digital single-lens reflex camera 1a as the imaging apparatus of the embodiment differs from that of the first embodiment in that the temperature sensor and thermometric circuit for measuring the temperature of the image pickup device 130 are omitted.

The following describes a main routine executed by the CPU 101 of the system controller 100 in the single-lens reflex camera 1a of the embodiment with reference to FIGS. 12 to 15. Note that processing steps shown in FIG. 12 to FIG. 14, i.e., processing steps S100 to S165 are the same as in the first embodiment except for step S112.

In the first embodiment, the temperature threshold parameters are set in step S112, but in the embodiment, noise threshold parameter is set. In other words, the noise threshold parameter is read from the flash ROM 120 according to the shooting mode. The other processing steps from step S100 to step S165 are the same as those in the first embodiment and description thereof will be omitted.

Figure 13:
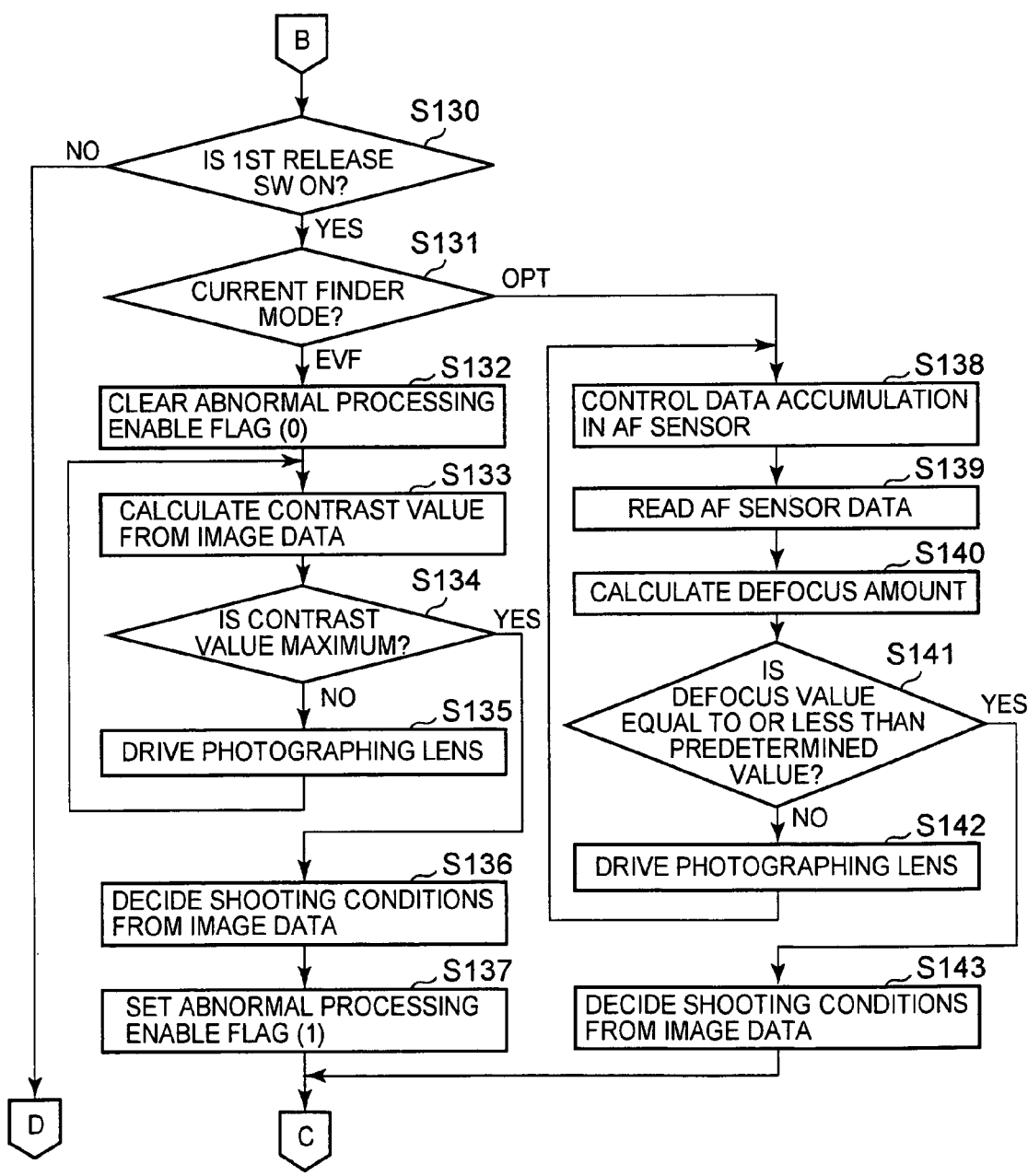
FIG. 13 is a flowchart of the main routine executed in the single lens reflect camera according to the second embodiment of the present invention.
Figure 14:
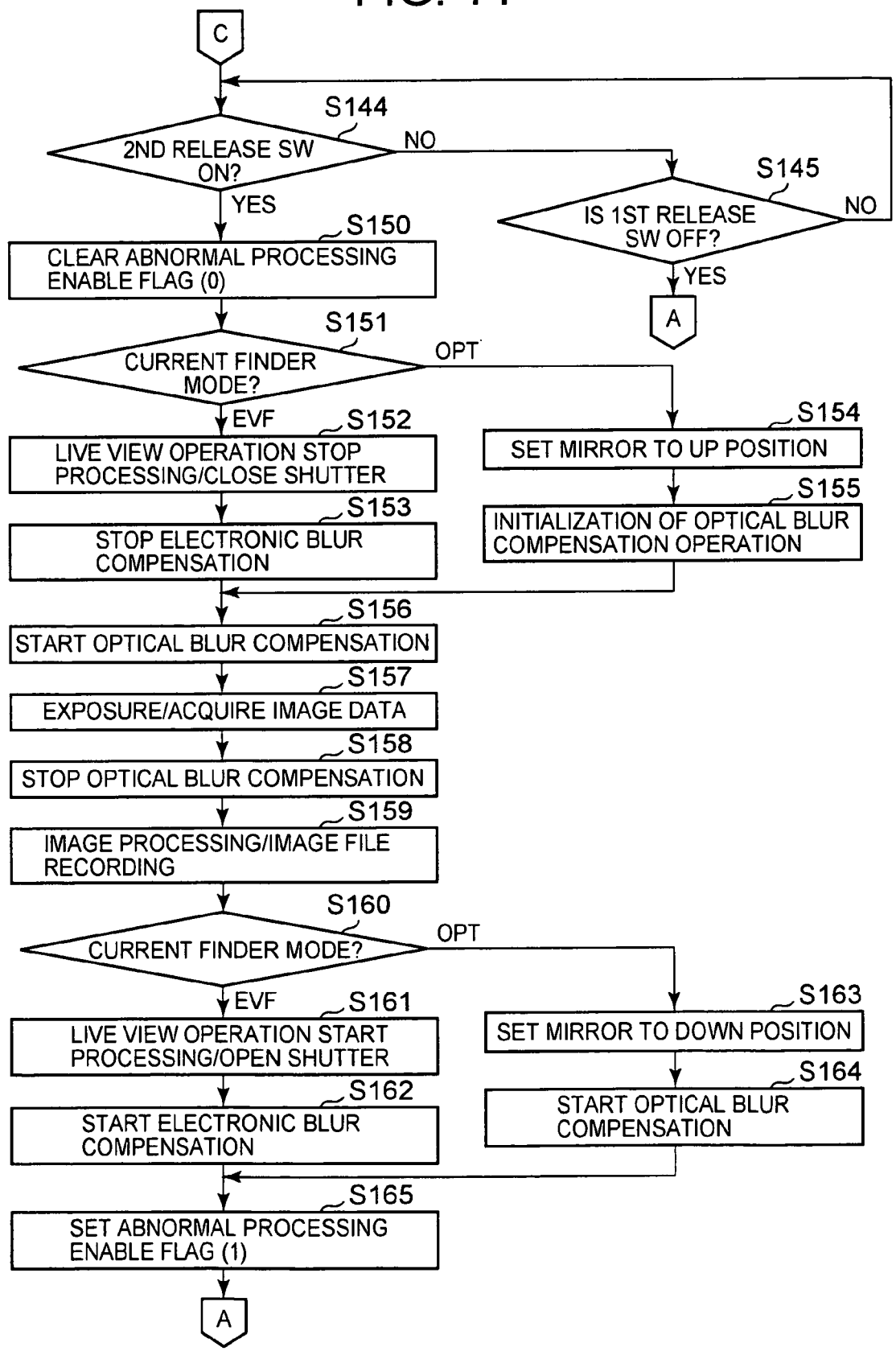
FIG. 14 is a flowchart of the main routine executed in the single lens reflect camera according to the second embodiment of the present invention.
Figure 15:
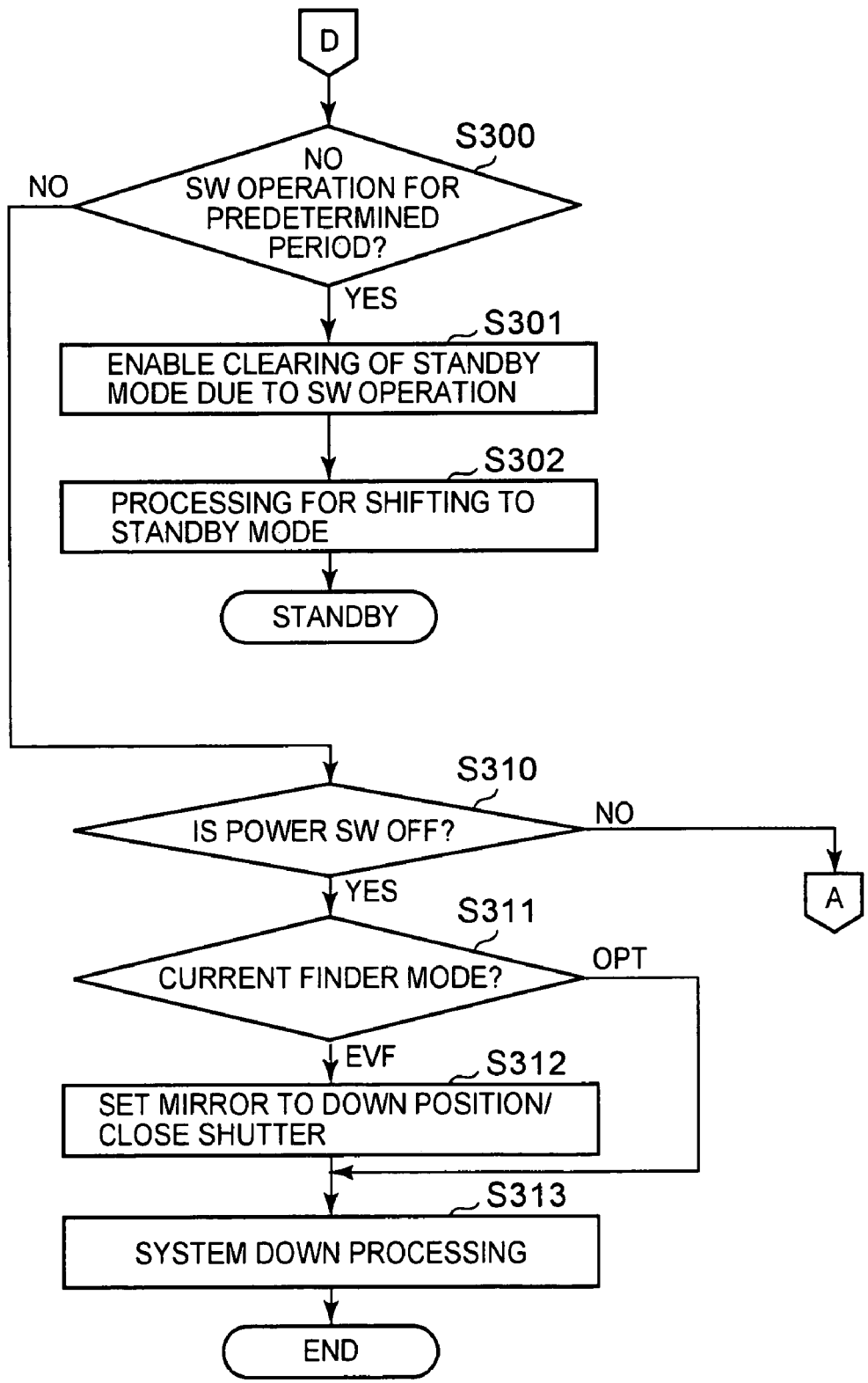
FIG. 15 is a flowchart of the main routine executed in the single lens reflect camera according to the second embodiment of the present invention.

If it is determined in step S130 of FIG. 13 that the 1st release SW is not ON-state, it is next determined in step S300 of FIG. 15 whether a predetermined period of time has elapsed since the last operation of the operation SW 134. If it is determined in step S300 that the predetermined period of time has elapsed since the last operation of the operation SW 134, the procedure proceeds to step S301 to perform processing for shifting to the standby mode.

In step S301, if the operation SW 134 is operated during the standby mode, an interrupt signal is generated to activate the CPU 101. This is to clear the standby mode and start the main routine whenever the operation SW 134 is operated. Then, in step S302, the processing for shifting to the standby mode is performed.

On the other hand, if it is determined in step S300 that the predetermined period of time has not elapsed since the last operation of the operation SW 134, the procedure shifts to step S310. In step S310, it is determined whether the power SW as one of the operation SW is OFF-state or not. Here, if the power SW is not OFF-state, i.e., if it is ON-state, the procedure returns to S110 to continue the main routine.

In step S310, if the power SW as one of the operation SW is OFF-state, it is then determined in step S311 whether the current finder mode is the OPT mode or the EVF mode.

If it is determined in step S311 that the current finder mode is the EVF mode, the procedure proceeds to step S312 to move the quick return mirror 170 from the UP position to the DOWN position. Then, the shutter 150 is brought to the closed state. After that, the procedure proceeds to step S313 to stop the operation of all the circuits in the single-lens reflex camera 1a in order to terminate the system.

On the other hand, if it is determined in step S311 that the current finder mode is the OPT mode, since the processing step S312 is not needed, the procedure proceeds to step S313 to stop the operation of all the circuits in the single-lens reflex camera 1a in order to terminate the system.

The above is the main routine processing to be executed in the single-lens reflex camera 1a of the embodiment.

Figure 16:
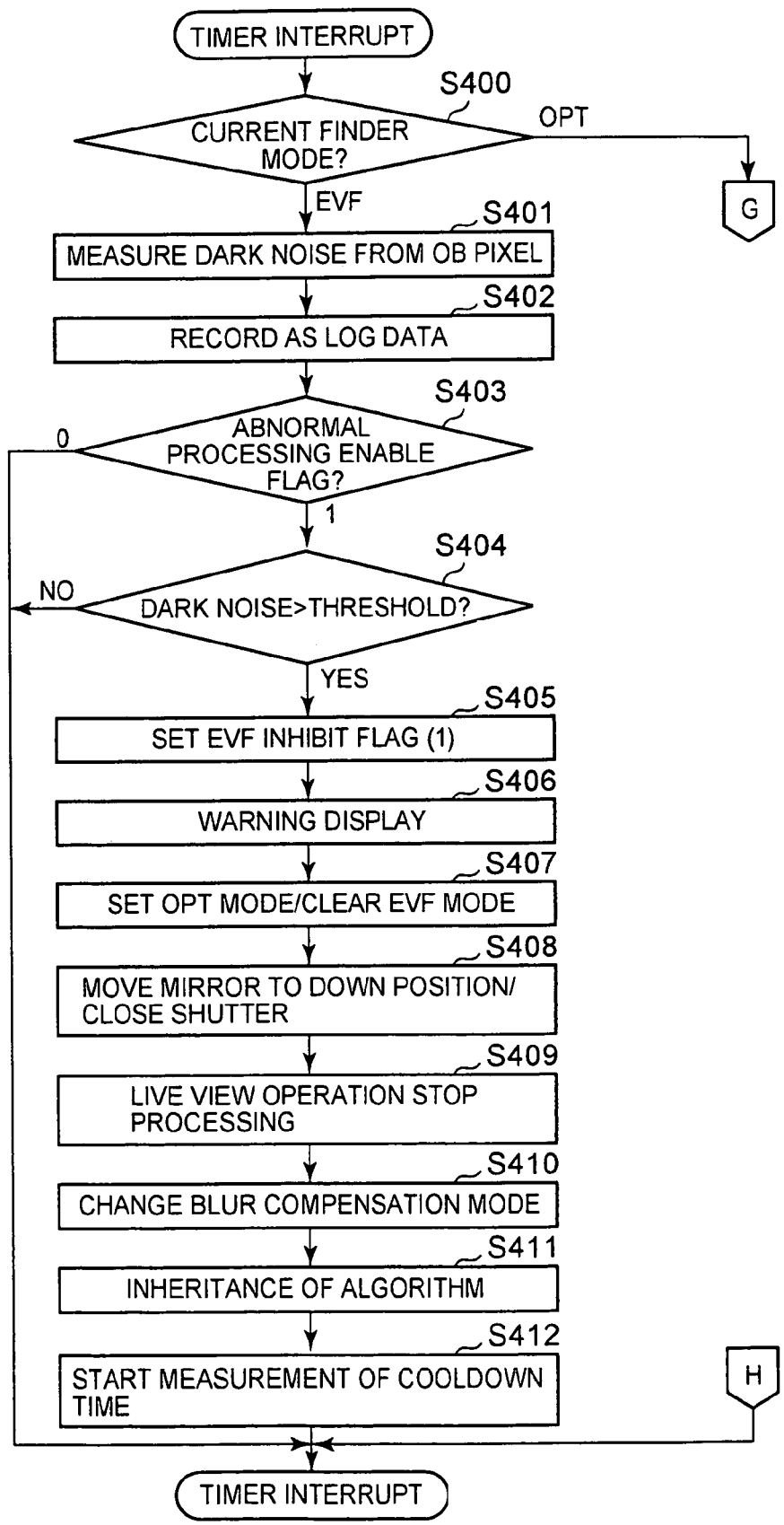
FIG. 16 is a flowchart of a timer interrupt routine according to the second embodiment of the present invention.
Figure 17:
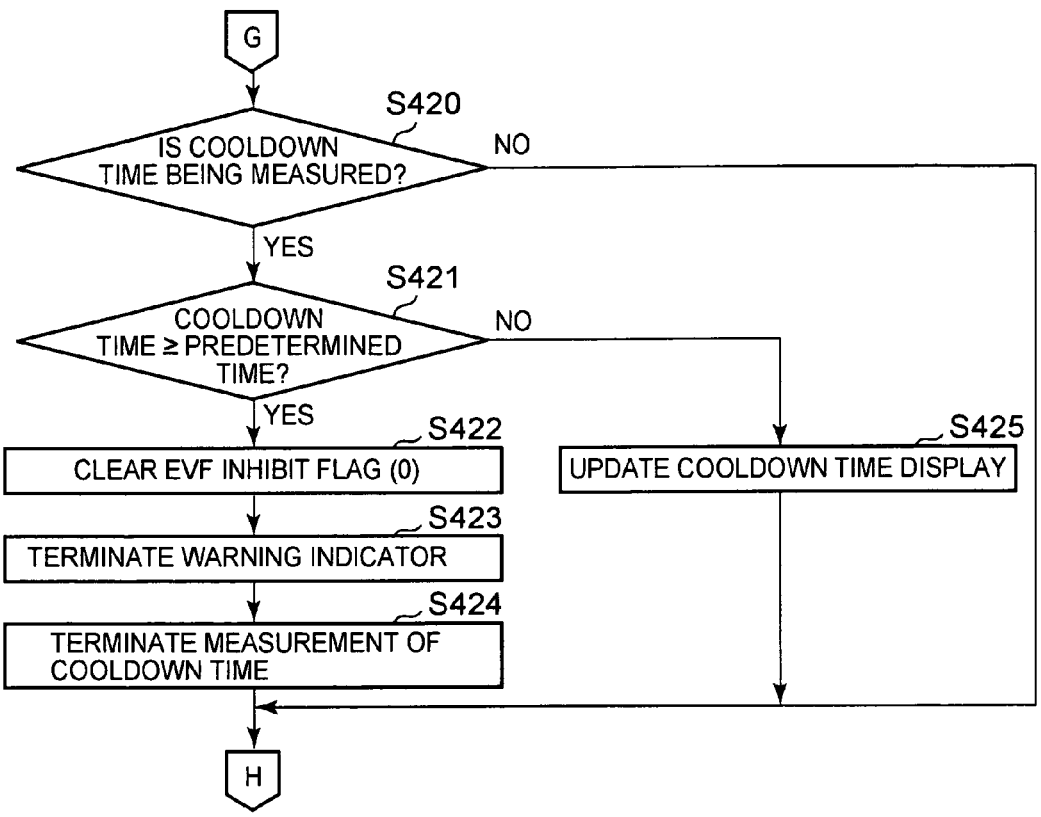
FIG. 17 is a flowchart of the timer interrupt routine according to the second embodiment of the present invention.

Next, timer interrupt processing performed by the system controller 100 in response to a timer interrupt will be described with reference to FIGS. 16 and 17. A timing signal output from the timer counter 108 every predetermined cycle triggers the timer interrupt processing.

First, in step S400, it is determined whether the current finder mode is the OPT mode or the EVF mode. If it is determined in step S400 that the current finder mode is the EVF mode, the procedure proceeds to step S401, while if it is the OPT mode, the procedure shifts to step S420. If the current finder mode is the EVF mode, since the circuits necessary to acquire the output of the image pickup device 130 from the OB pixel are operated, the noise level can be calculated from the output of the OB pixel. On the other hand, if the current finder mode is the OPT mode, since the image pickup device 130 is not driven, the noise level cannot be calculated by this method. This is why the determination step S400 is provided.

If it is determined in step S400 that the current finder mode is the EVF mode, the image pickup device IF circuit 131 is controlled in the next step S401 to read the output of the OB pixel of the image pickup device 130. The output of this OB pixel corresponds to the level of dark noise of each pixel of the image pickup device 130.

Next, in step S402, the measured output value of the OB pixel is written to the temperature log data stored in the flash ROM 120 together with the time at which the measurement was performed to update the temperature log data.

Next, in step S403, the state of the abnormal processing enable flag is determined. Here, if the value of the abnormal processing enable flag is "0," the procedure returns from the interrupt routine to the main routine. In other words, only the output of the OB pixel is measured in the timer interrupt processing in this case. This is to avoid the influence of the timer interrupt processing on the shooting preparation operations and the shooting operation of the single-lens reflex camera 1a.

If it is determined in step S403 that the value of the abnormal processing enable flag is "1," the procedure proceeds to step S404.

In step S404, the measured output (dark noise) of the OB pixel is compared with a predetermined threshold. Here, if the output of the OB pixel is larger than the threshold, the procedure proceeds to step S405, while if the output of the OB pixel is less than the threshold value, the procedure returns to the main routine.

Note that this threshold is a value varying depending on the shooting mode and the shooting conditions of the single-lens reflex camera 1a. Like in the first embodiment, this threshold is set by referring to a threshold table set according to the shooting mode and the shooting conditions stored in the flash ROM 120.

Specifically, the threshold is a value defining the upper limit of the noise level below which the influence of noise on the acquired image of the image pickup device 130 is acceptable. In other words, it is considered in the single-lens reflex camera 1a of the embodiment that, if the output of the OB pixel of the image pickup device 130 is less than the threshold, the influence, on the acquired image, of noise generated in the image pickup device 130 can be substantially eliminated. Note that the threshold takes on smaller values as the shooting mode is more susceptible to the influence of noise.

Figure 18:
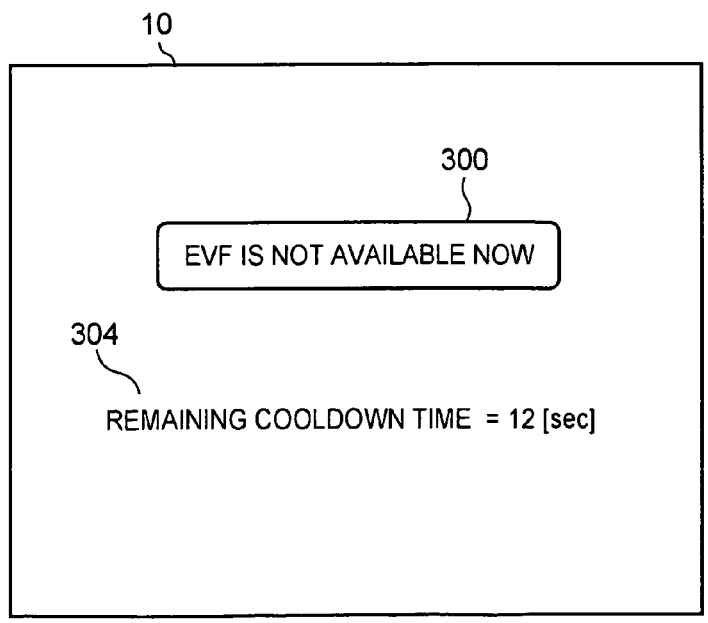
FIG. 18 is a diagram showing a display example of a warning upon inhibiting the EVF mode according to the second embodiment of the present invention.

Next, in step S405, the value of the EVF inhibit flag is set to "1." As a result, changing the finder mode from the OPT mode to the EVF mode is inhibited. Next, in step 406, the warning indicator 300 and remaining cooldown time 304 are displayed on the LCD device 10 as shown in FIG. 18. This display is to notify the user that the temperature of the image pickup device 130 is too high to use the EVF mode.

Next, the procedure proceeds to step S407 to set the finder mode to the OPT mode in order to end the EVF mode. Next, in step S408, the quick return mirror is moved from the UP position to the DOWN position, and further the shutter 150 is brought to the closed state.

Next, in step S409, the live view operation for displaying image data from the image pickup device 130 on the LCD device 10 is stopped. Next, in step S410, the blur compensation mode is changed from the electronic blur compensation operation to the optical blur compensation operation. Then, in step S411, the inheritance operations of the shooting algorithms are performed, where the parameters are so delivered that the results of the AE algorithm and AF algorithm in the EVF mode match the results of the AE algorithm and AF algorithm in the OPT mode.

Next, in step S412, the measurement of the cooldown time is started. In the embodiment, the operation of the image pickup device is inhibited for a predetermined period of time since the operation of the EVF mode has been inhibited in order to cool down the image pickup device 130. Therefore, counting of the signal output from the timer counter 108 is started after the operation of the image pickup device 130 is stopped to start the measurement of the cooldown time. After starting the measurement of the cooldown time, the procedure returns to the main routine.

On the other hand, if it is determined in step S400 that the current finder mode is the OPT mode, it is next in step S420 whether the cooldown is being measured or not. If the cooldown time is being measured, the procedure proceeds to step S421, while if it is not being measured, the procedure returns to the main routine.

In step S421, it is determined whether the cooldown time is equal to or more than a predetermined period of time. If the cooldown time is equal to or more than the predetermined period of time, the procedure proceeds to step S422, while if it is less than the predetermined period of time, the procedure proceeds to step S425. The predetermined period of time used in this determination is stored in the flash ROM.

If it is determined in step S421 that the cooldown time is equal to or more than the predetermined period of time, the value of the EVF inhibit flag is set to "0" in the next step S422. In other words, since the operation of the image pickup device 130 has been stopped for the predetermined period of time or more, it is considered that the temperature of the image pickup device 130 is dropped enough to reduce the noise level to such an extent that EVF is selectable. This allows the user to change the finder mode from the OPT mode to the EVF mode.

Next, in step S423, the warning indicator displayed on the LCD device 10 is turned off. Then, in step S424, the measurement of the cooldown time is stopped and the procedure returns to the main routine. After returning to the main routine, information such as the camera operating mode, exposure condition data (aperture value and shutter speed) calculated based on the output from the light metering circuit, the number of shot frames, etc. is displayed on the LCD device. This display allows the user to know that the finder mode is changeable.

If it is determined in step S421 that the cooldown time is less than the predetermined period of time, the remaining cooldown time 304 displayed on the LCD device 10 is updated in step S425. Note here that the remaining cooldown time 304 displayed on the LCD device 10 is a value obtained by subtracting the cooldown time from the predetermined period of time. This display allows the user to recognize the time until the EVF mode becomes available. After updating the remaining cooldown time 304, the procedure returns to the main routine.

In the embodiment, if the OPT mode is selected, the output of the OB pixel is not measured in the timer interrupt processing to save power. However, the image pickup device 130 can be driven even in the OPT mode to periodically measure the output of the OB pixel. In this case, the output of the OB pixel can be measured only when the battery power is sufficient in consideration of the remaining power of the battery 137. Alternatively, the output of the OB pixel can be measured only when power is supplied from an external power source.

Further, like in the first embodiment, the single-lens reflex camera 1a can include a temperature sensor for measuring the temperature of the image pickup device 130 in such a manner that the temperature sensor measures the temperature of the image pickup device 130 in the OPT mode to calculate the noise level of the image pickup device 130 from this measurement result.

Third Embodiment

In the first embodiment, if the EVF mode is set when the temperature of the image pickup device exceeds Tth2, the finder mode is automatically changed from the EVF mode to the OPT mode. Then, the setting of the EVF mode as the finder mode is inhibited until the temperature of the image pickup device becomes Tth1 (<Tth2). The following describes the outline of a third embodiment.

If the temperature of the image pickup device exceeds Tth1 on condition that the EVF mode is set, an operation for suppressing the temperature rise of the image pickup device is performed. In other words, the frequency of the clock signal for driving the image pickup device is reduced. In this case, as the frequency of the clock signal is reduced, the frame frequency in the EVF mode is dropped. As a result, the amount of one frame data to be read from the image pickup device is also reduced. This degrades the image quality on the LCD device 10, but causes no change in frame rate. Further, if the temperature of the image pickup device increases and exceeds Tth2 (>Tth1); the imaging apparatus system is stopped to decrease the temperature of the image pickup device.

Figure 19:
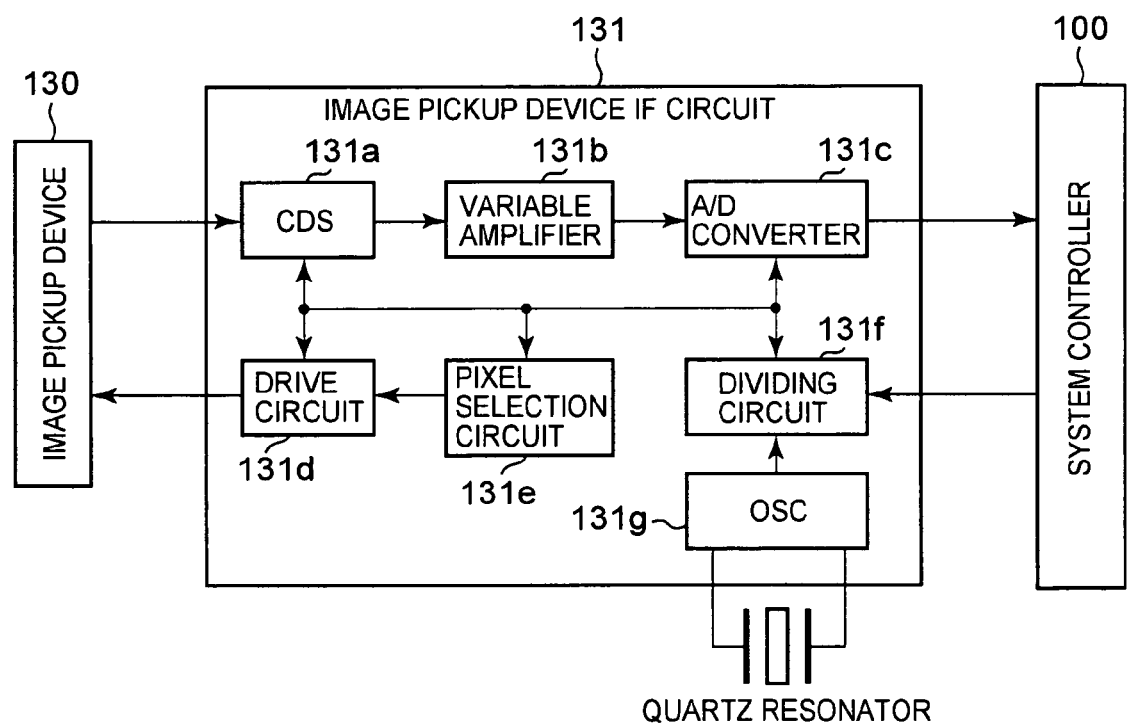
FIG. 19 is a block diagram showing the structure of an image pickup device interface circuit according to a third embodiment of the present invention.

The following describes only portions of the third embodiment different from those of the first embodiment. The system structure is basically the same as that of the first embodiment shown in FIG. 1 except the structure of the image pickup device IF circuit. FIG. 19 is a block diagram showing the structure of an image pickup device IF circuit according to the third embodiment. In FIG. 19, a CDS (Correlated Double Sampling) circuit 131*a* extracts the output of each of the pixels that form the image pickup device 130 from the output signal from the image pickup device 130. A variable amplifier 131*b* amplifies the output of the CDS 131*a* at an amplification factor set by the system controller 100. The amplified signal is converted by an A/D converter 131*c* to digital data and the converted digital data is output to the system controller 100. A drive circuit 131*d* outputs a pulse signal for driving the image pickup device 130. A pixel selection circuit 131*e* generates a read signal for reading necessary pixel data from the pixels that form the image pickup device 130. This signal thins out pixel data unnecessary to be read. The number of pixel data that form the image pickup device 130 is larger than that of pixel data displayable on the LCD device 10. Therefore, image data read from the image pickup device 130 in the EVF mode correspond to image data obtained by thinning out unnecessary image data by the pixel selection circuit 131*e*. The number of pixel data obtained by thinning out unnecessary image data (i.e., the number of pixel data to be read from the image pickup device 130) is changeable in accordance with an instruction from the system controller 100. In other words, the rate of thinning out can be changed in accordance with the instruction from the system controller 100. If the rate of thinning out is set to a large value (i.e., if the rate of thinning out increases), the number of pixel data to be read from the image pickup device 130 is reduced (image quality is degraded). On the other hand, if the rate of thinning out is set to a small value (i.e., if the rate of thinning out decreases), the number of pixel data to be read from the image pickup device 130 increases (image quality is enhanced).

An OSC (Oscillator) 131*g* has a resonator for generating a clock signal necessary for the operation of the image pickup device 3 IF circuit 131. This clock signal is divided by a dividing circuit 131*f* to necessary frequencies and supplied to each of the circuit blocks. This frequency dividing rate of the dividing circuit 131*f* can be changed to change the reading speed from the image pickup device 130.

Next, the operation of the system controller according to the third embodiment will be described with reference to FIGS. 20 and 21. Since the main routine is the same as that of the first embodiment (FIGS. 2, 3, 4, and 5), the redundant description thereof will be omitted. In other words, the timer interrupt routine (FIGS. 6 and 7) in the first embodiment is replaced with FIGS. 20 and 21 in the third embodiment.

Figure 20:
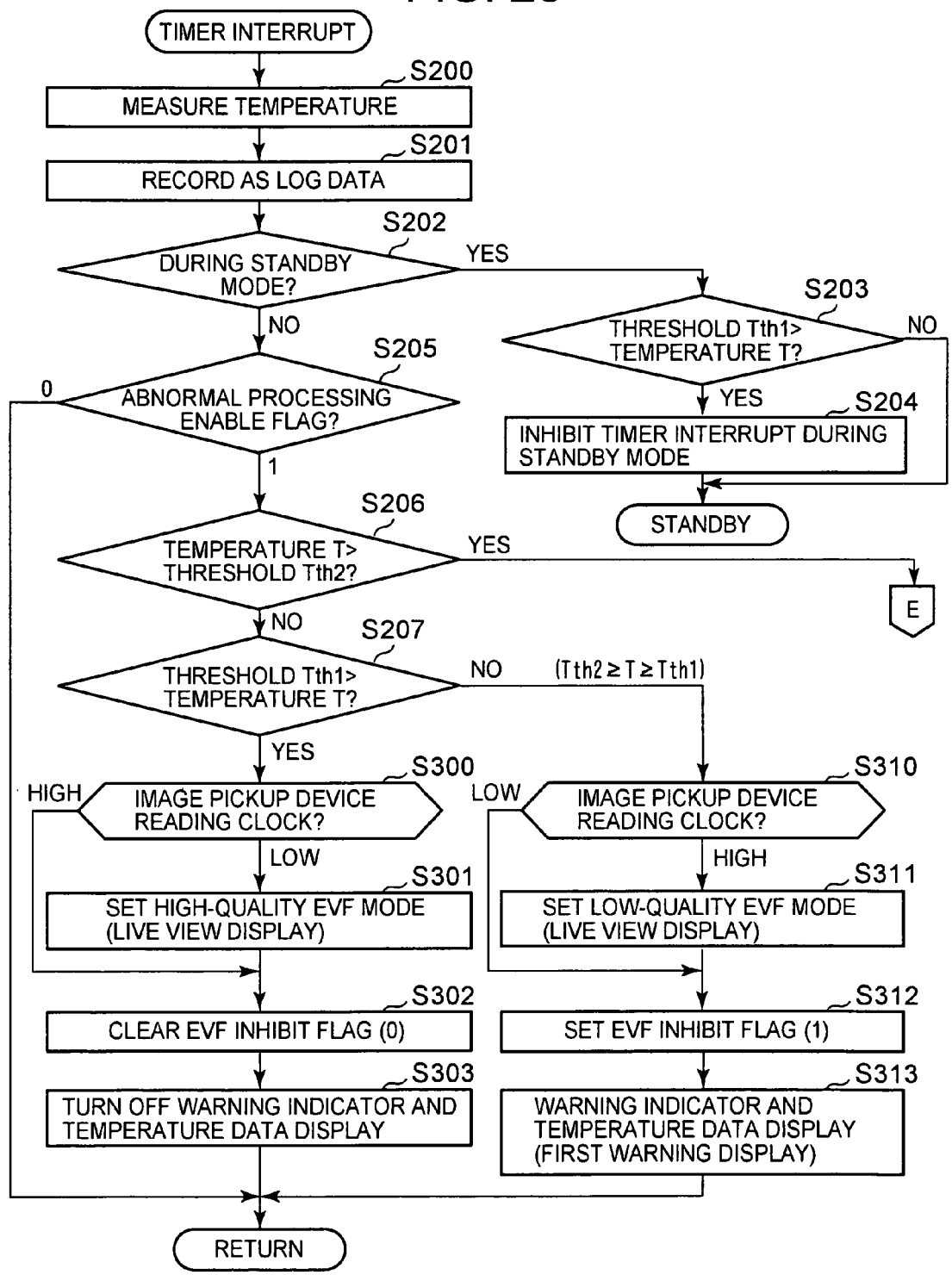
FIG. 20 is a flowchart showing the operation of a system controller according to the third embodiment of the present invention.
Figure 21:
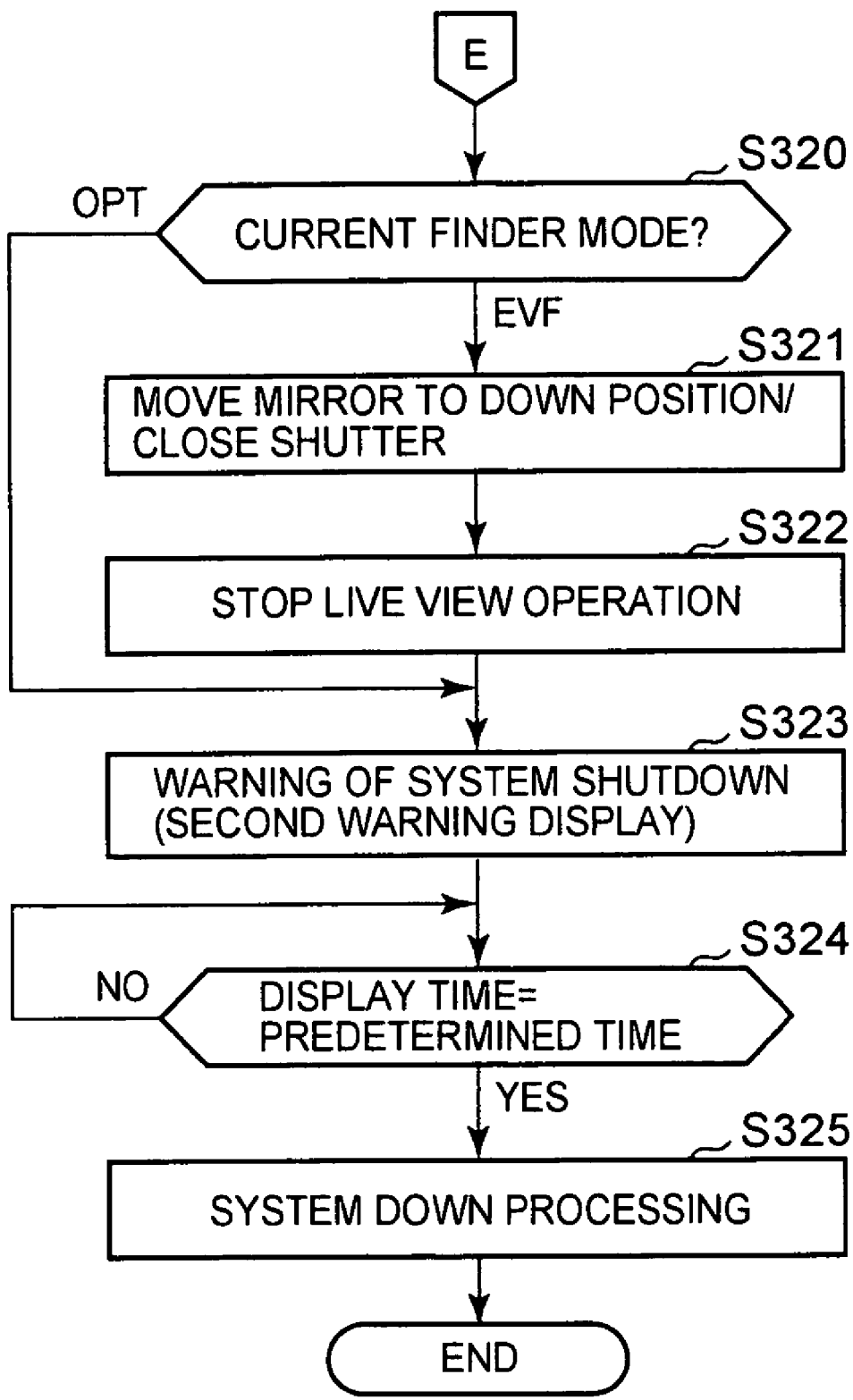
FIG. 21 is a flowchart showing the operation of the system controller according to the third embodiment of the present invention.

The following describes timer interrupt processing performed by the system controller 100 in response to a timer interrupt with reference to FIGS. 20 and 21. As mentioned above, the timer interrupt processing is triggered by the timing signal output from the timer counter 108 every predetermined period of time.

First, in step S200, the output of thermometric circuit 141 is AD converted to measure the temperature T of the image pickup device 130. Next, in step S201, the measurement result of the temperature T is written to the temperature log data stored in the flash ROM 120 together with the time at which the measurement operation was performed to update the temperature log data. The time at which the measurement operation was performed is acquired from the clock circuit 138.

Next, in step S202, it is determined whether the single-lens reflex camera 1 is in the standby mode at present or not. If it is in the standby mode, the procedure proceeds to step S203, while if it is in the normal operation, the procedure proceeds to step S205.

If it is determined in step S202 that the single-lens reflex camera 1 is in the standby mode, it is then determined in step S203 whether the current temperature T of the image pickup device 130 is lower than the temperature threshold parameter Tth1. If the current temperature T of the image pickup device 130 is lower than the temperature threshold parameter Tth1, the procedure proceeds to step S204 to inhibit the execution of the timer interrupt processing during the standby mode, and then the single lens reflex camera 1 enters the standby mode. The reason why the timer interrupt processing is inhibited during the standby mode is that the temperature T of the image pickup device 130 is low enough and there is no need to measure the temperature T.

On the other hand, if it is determined in step S203 that the current temperature T of the image pickup device 130 is equal to or higher than the temperature threshold parameter Tth1, since it means that the temperature T needs to be continuously measured, the single lens reflex camera 1 enters the standby mode without inhibiting the interrupt.

On the other hand, if it is determined in step. S202 that the single-lens reflex camera 1 is currently in the normal operation, the state of the abnormal processing enable flag is next determined in step S205. Here, if the value of the abnormal processing enable flag is "0," the procedure returns from the interrupt routine to the main routine. In other words, only the temperature T is measured in the timer interrupt processing in this case. This is to avoid the influence of the timer interrupt processing on the shooting preparation operations and the shooting operation of the single-lens reflex camera 1.

For example, the shooting preparation operations in the EVF mode include the focusing operation (AF operation), the light metering operation (AE operation), and the like. Therefore, if the finder mode is switched from the EVF mode to the OPT mode during these shooting preparation operations, the shooting preparation operations are terminated even during the shooting preparation operations. In this case, the shooting preparation operations need to be performed again after the finder mode is switched to the OPT mode. Thus, if the finder mode is changed during the shooting preparation operations, the release time lag increases and hence the user could miss his or her intended shooting timing. For this reason, the abnormal processing enable flag is set to "0" during the shooting preparation operations.

If it is determined in step S205 that the value of the abnormal processing enable flag is "1," the procedure proceeds to step S206.

In steps S206 and S207, the measured temperature T of the image pickup device 130 is compared with the temperature threshold parameter Tth1 and Tth2 as predetermined threshold values, respectively. Here, if the temperature T of the image pickup device 130 satisfies Tth2≧T≧Tth1, the procedure proceeds to step S310. If the temperature T of the image pickup device 130 satisfies Tth1>T, the procedure proceeds to step S300. If the temperature T of the image pickup device 130 satisfies T>Tth2, the procedure proceeds to step S320.

In step 300, the state of reading clock setting of the image pickup device IF circuit 131 (i.e., the dividing rate of the dividing circuit) is determined. If the clock frequency is set to High (low dividing rate), the procedure proceeds to step S302, while if it is set to Low (high dividing rate), the procedure proceeds to step S301. In step S301, a control signal for changing the reading clock frequency of the image pickup device 130 from Low to High is sent to the image pickup device IF circuit 131. Further, a control signal for reducing the rate of thinning out performed by the pixel selection circuit is sent to the image pickup device IF circuit 131. This operation can increase the resolution of an image to be displayed on the LCD device 10 when the EVF mode is selected.

Figure 2:
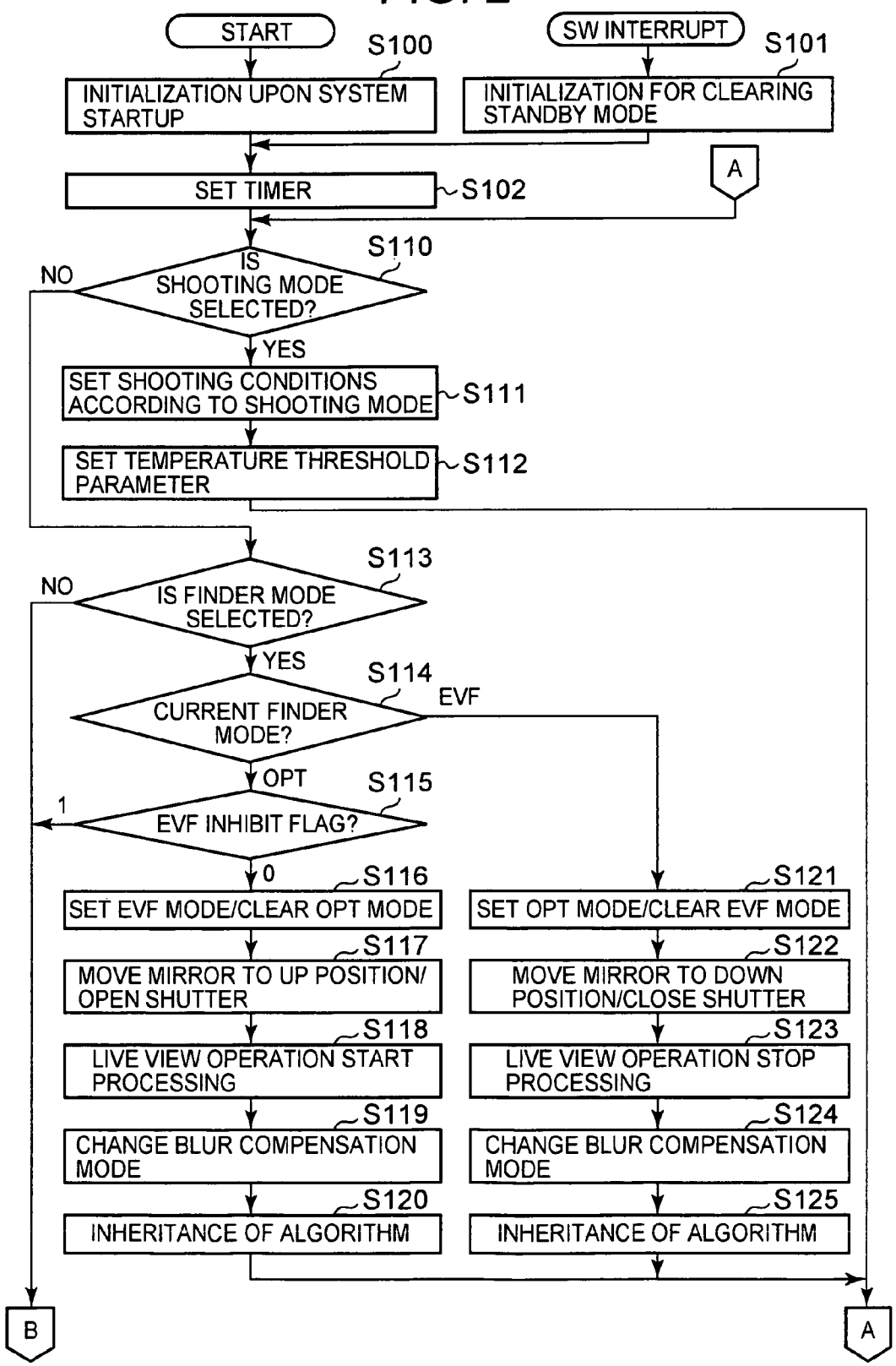
FIG. 2 is a flowchart of a main routine executed in the single lens reflect camera according to the first embodiment of the present invention.
Figure 3:
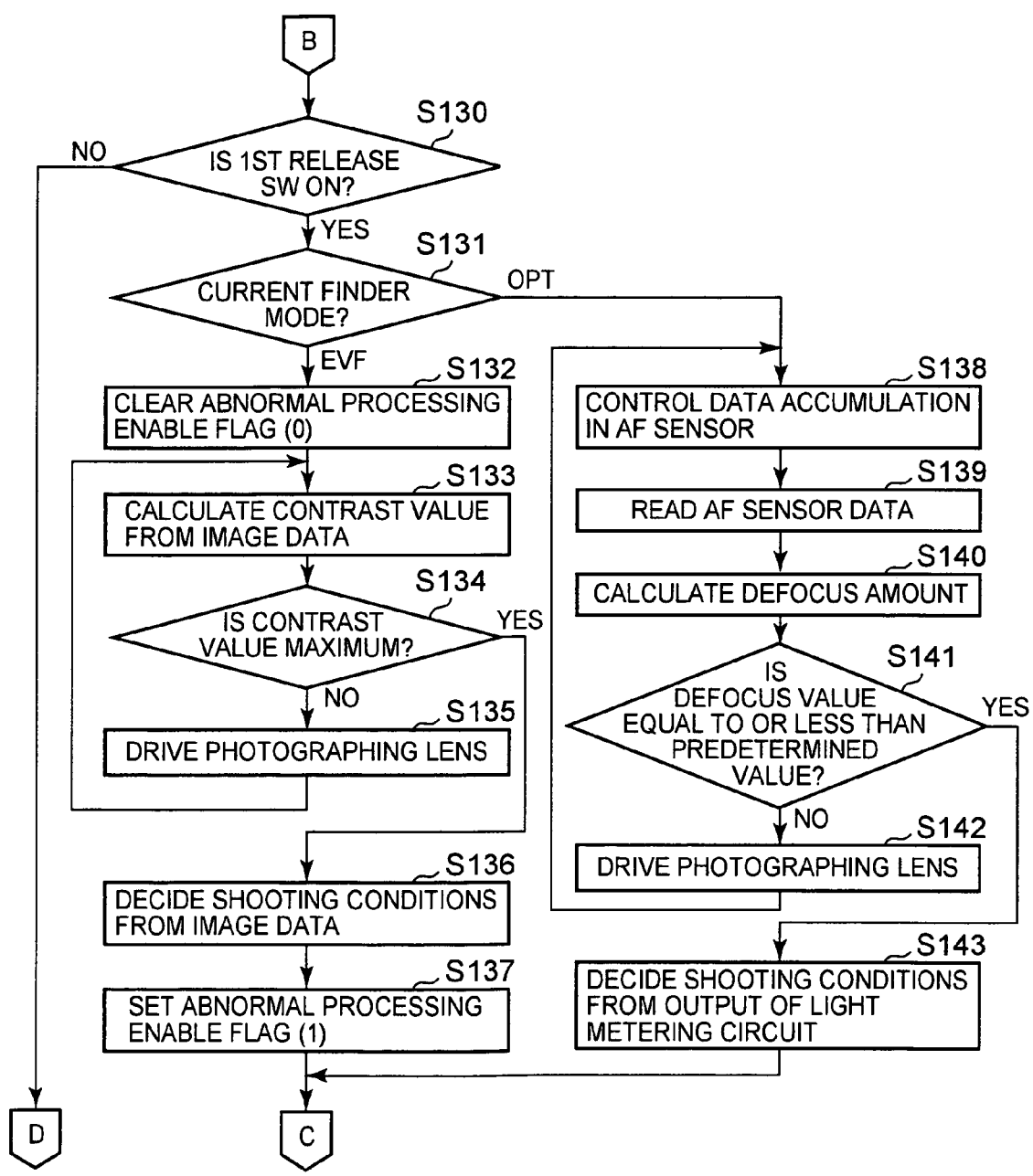
FIG. 3 is a flowchart of the main routine executed in the single lens reflect camera according to the first embodiment of the present invention.
Figure 4:
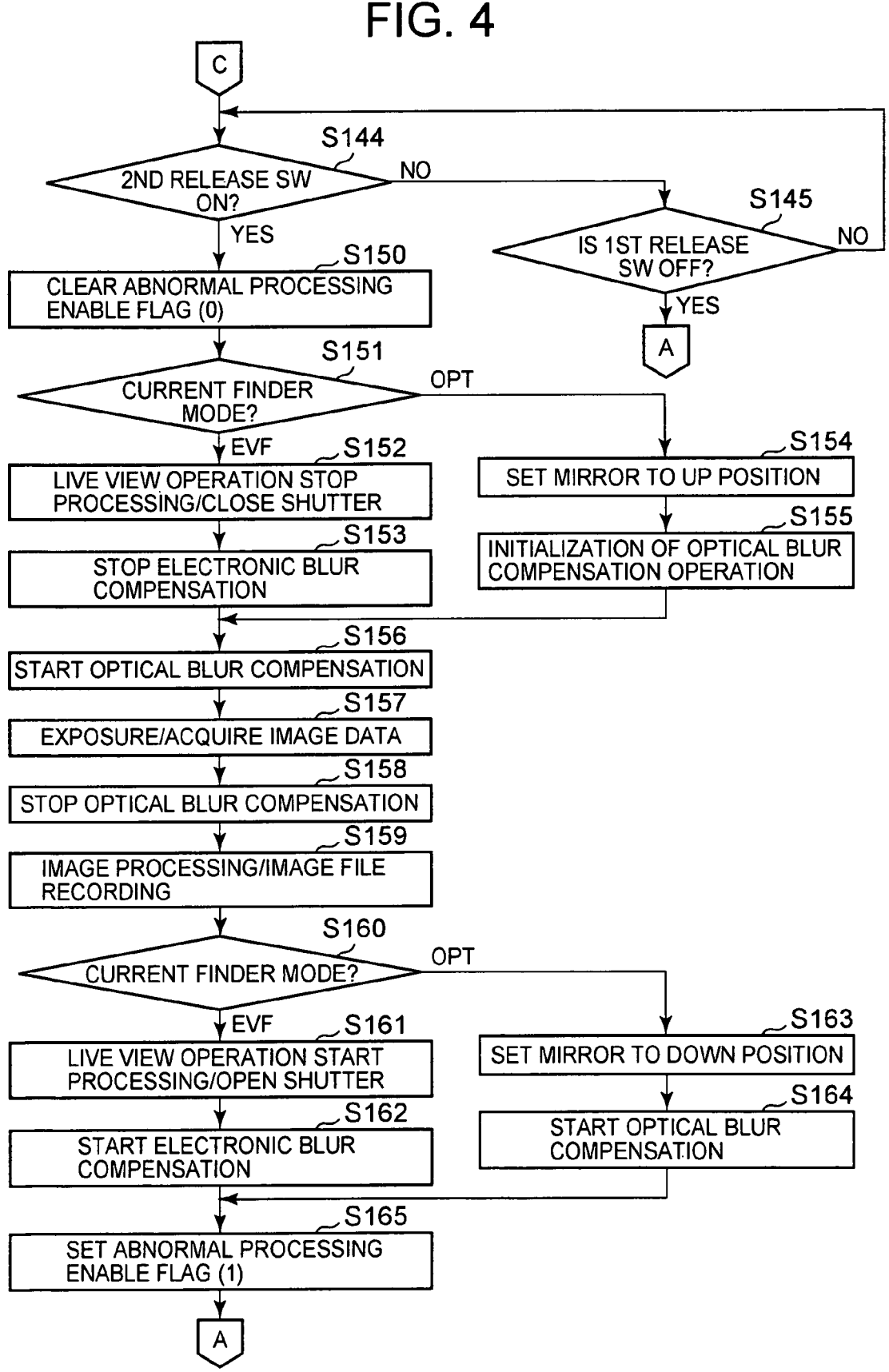
FIG. 4 is a flowchart of the main routine executed in the single lens reflect camera according to the first embodiment of the present invention.
Figure 5:
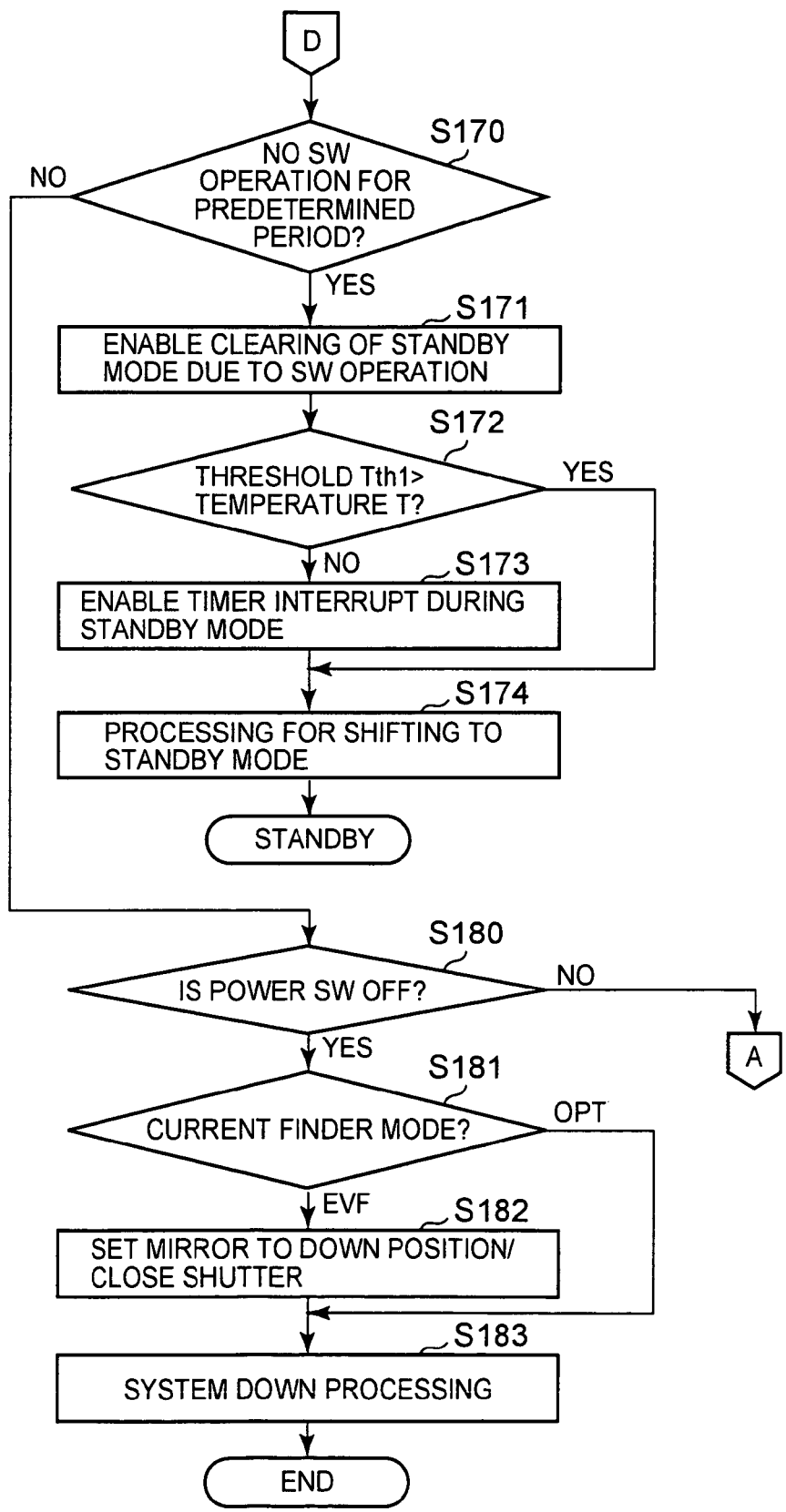
FIG. 5 is a flowchart of the main routine executed in the single lens reflect camera according to the first embodiment of the present invention.

In step S302, the value of the EVF inhibit flag is set to "0." Since the EVF inhibit flag is cleared, changing the finder mode from the OPT mode to the EVF mode is allowed (see FIG. 2 about the finder mode changing operation). Next, in step S303, the warning indicators (330, 331, 332) shown in FIG. 23 displayed on the LCD device 10 are turned off. Then, the procedure returns to the main routine. Since the warning indicators are turned off, the user can know that the finder mode can change from the OPT mode to the EVF mode.

In step S310, the state of reading clock setting of the image pickup device IF circuit 131 (i.e., the dividing rate of the dividing circuit) is determined. If the clock frequency is set to High (low dividing rate), the procedure proceeds to step S311, while if it is set to Low (high dividing rate), the procedure proceeds to step S312. In step S311, a control signal for changing the reading clock frequency of the image pickup device 130 from High to Low is sent to the image pickup device IF circuit 131. Further, a control signal for reducing the rate of thinning out performed by the pixel selection circuit is sent to the image pickup device IF circuit 131. This operation can reduce the resolution of an image to be displayed on the LCD device 10 when the EVF mode is selected. Thus, the resolution of the image can be reduced to reduce the operation speed of the image pickup device 130 and the image pickup device IF circuit 131 while maintaining the frame rate. The reduced operation speed can reduce power consumption to suppress the temperature rise.

Although this embodiment teaches that the frame rate is maintained, some users may want to give priority to the resolution of the image to be displayed on the LCD device 10, rather than to maintain the frame rate. For the convenience of such users, this embodiment can be configured such that the user can select either the resolution priority or the frame rate priority. Alternatively, either of the priorities can be automatically selected according to the shooting mode or image size to be recorded.

In step S312, the value of the EVF inhibit flag is set to "1." As a result, changing the finder mode from the OPT mode to the EVF mode is inhibited. This inhibited state is kept until the temperature of the image pickup device 130 becomes less than the temperature threshold parameter Tth1.

Figure 23:
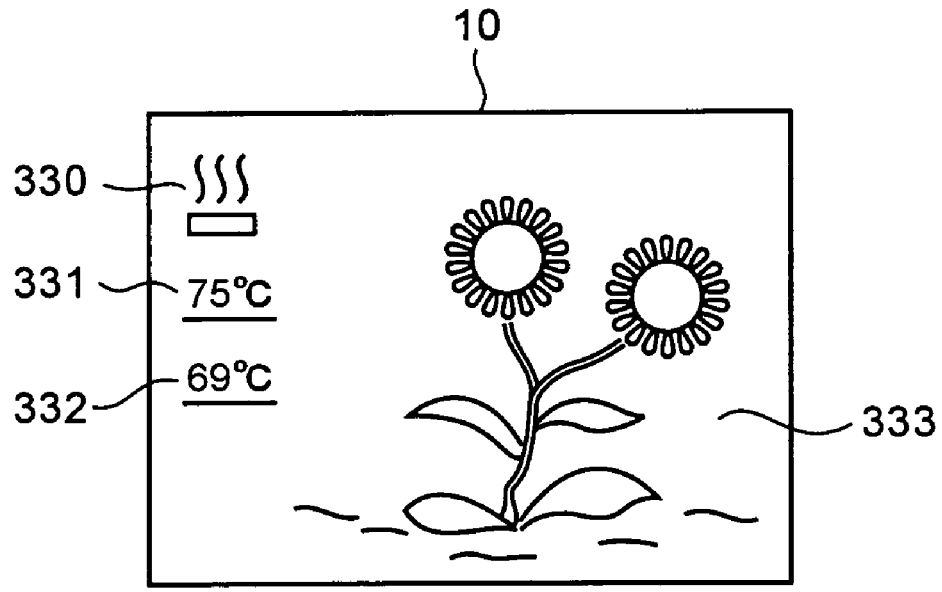
FIG. 23 is a diagram showing a warning indicator to be displayed on a display unit according to the third embodiment of the present invention.

Next, in step S313, a warning display (first display mode) as shown in FIG. 23 is provided on the LCD device 10. After the display operation is performed, the procedure returns to the main routine. In FIG. 23, a display example of warning indicators (330, 331, and 332) superimposed on a subject image 333 is illustrated. 330 illustrates an icon for visually notifying the user that the temperature rises. 331 indicates the temperature at which the camera system will be stopped. 332 indicates the current temperature measured by the temperature sensor. The data indicated by 332 is temperature data measured in response to the timer interrupt. The user can compare 331 and 332 to predict the time at which the system will be stopped. Further, the user can switch the finder mode from the EVF mode to the OPT mode at his or her discretion. If the OPT mode is selected, the subject image disappears from the LCD device 10 and only the warning indicators (330, 331, 332) are displayed until the temperature becomes equal to or more than Tth1.

In step S320, the state of the finder mode currently set is determined. If the current finder mode is set in the OPT mode, the procedure proceeds to step S323, while it is set in the EVF mode, the procedure proceeds to step S321. In step S321, the quick return mirror 170 is moved from the UP position to the DOWN position, and further the shutter 150 is brought to the closed state. In step S322, the live view operation for displaying image data from the image pickup device 130 on the LCD device 10 is stopped.

Figure 24:
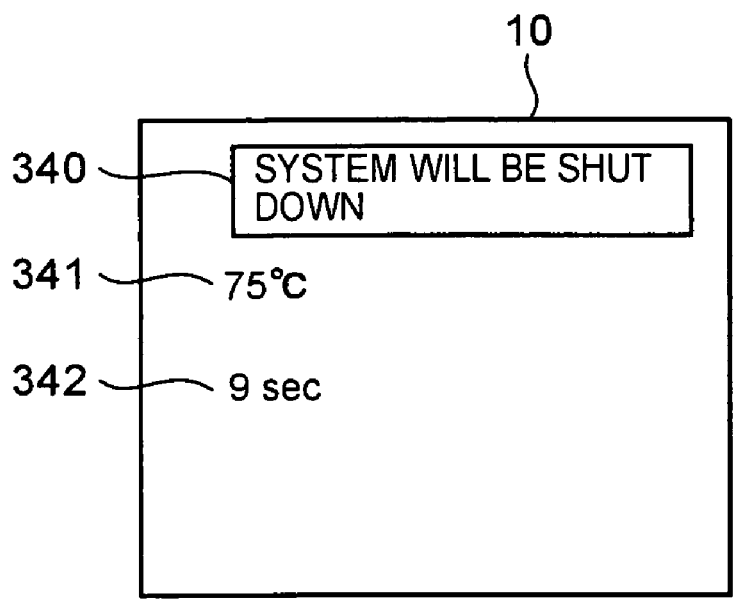
FIG. 24 is a diagram showing a warning indicator to be displayed on the display unit according to the third embodiment of the present invention.

In step S323, a warning display (second display mode) is provided on the LCD monitor 10. In FIG. 24, a display example of warning indicators (340, 341, 342) are illustrated. 340 is a message to notify the user that the camera system is stopped. 341 indicates the current temperature of the image pickup device 130. 342 indicates the time until the system is stopped, i.e., it begins a countdown such as 10, 9, 8, . . . , 1. In step 324, it is determined whether the time until the system is stopped has elapsed or not. If a predetermined period of time (e.g., 10 sec.) has elapsed, the procedure proceeds to step S325 to perform processing for stopping the system (system down processing). As a result, power supply to each of the circuits that form the camera system is stopped to stop the operation of the camera system. In the embodiment, the operation of the camera system is stopped to assure that the temperature is dropped. However, the structure can be such that the operation of the camera system is simply inhibited until the temperature of the image pickup device becomes equal to or less than Tth1. Then, during inhibiting of the operation, only the measurement of the temperature is performed to display the temperature data on the LCD device 10. Note that the temperature of the image pickup device 130 can be displayed on the LCD device 10 even if the EVF mode is not selected.

Figure 22:
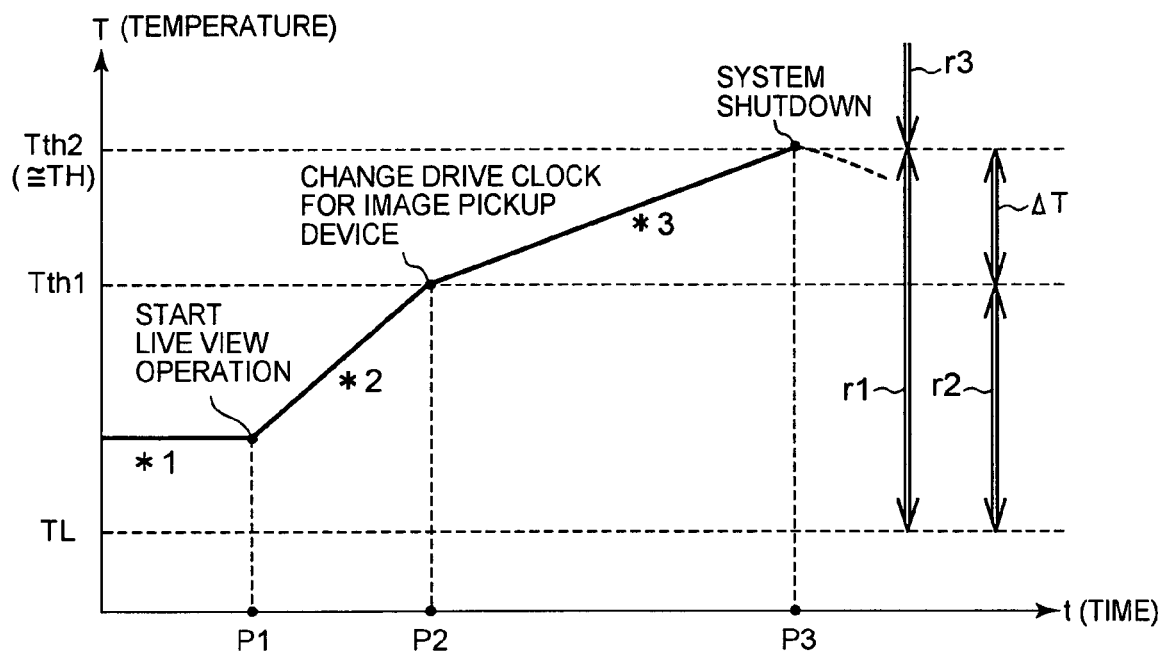
FIG. 22 is an explanatory diagram for explaining the operation of the system controller according to the third embodiment of the present invention.

The operation of the system controller according to the third embodiment will be described with reference to FIG. 22. A graph illustrated in FIG. 22 represents the temperature of the image pickup device 130 on the ordinate and time on the abscissa. Tth1 indicates a temperature threshold (first threshold). If the temperature T of the image pickup device 130 becomes equal to or more than Tth1, the first warning display is provided. Tth2 indicates another temperature threshold (second threshold. If the temperature T of the image pickup device 130 becomes equal to or more than Tth2, the second warning display is provided. Then, after displaying the second warning display, the system is stopped. Further, TL is the lower limit of temperature at which the image pickup device is operable, and TH is the upper limit of temperature at which the image pickup device 130 is operable. Here, Tth2 is set almost equal to TH.

When the camera system is activated, voltage is supplied to each of the circuit blocks. The image pickup device 130 is also supplied with voltage to bring it to the waiting state in which the temperature of the image pickup device 130 is kept constant (*1). Then, the user selects the EVF mode as the finder mode (P1). As a result, since the image pickup device 130 is driven to capture image data, the temperature of the image pickup device 130 increases (*2).

If the increased temperature of the image pickup device 130 becomes equal to or more than Tth1, the system controller 100 reduces the drive clock frequency for the image pickup device 130 (P2). For example, the drive clock is reduced to ½. This operation suppresses the temperature rise in the image pickup device 130 (*3) and hence the time period during which the EVF mode is available can be increased. The temperature of the image pickup device 130 increases even in the OPT mode if continuous shooting operations are performed. In such a case, since the drive clock is reduced, the temperature rise can be suppressed. Note that the shooting speed is reduced because the time for acquiring image data from the mage pickup device 130 increases. Then, if the temperature of the image pickup device 130 further increases and becomes equal to or more than Tth2, the system controller 100 stops the system (P3).

In a range (r1) of temperatures between TL to Tth2, both the EVF and OPT modes are available. In other words, the finder mode can be switched from EVF to OPT.

In a range (r3) of temperatures above Tth2, the finder mode can be switched from EVF to OPT. However; since the system is stopped, shooting is not allowed.

In a range (r2) of temperatures between TL to Tth1, the finder mode can be switched from OPT to EVF. Note that in a range of ΔT, switching from EVF to OPT is enabled but switching from OPT to EVF is inhibited. In other words, the EVF mode is inhibited until the temperature is reduced enough to be equal to or less than Tth1. This processing can prevent the operation of the system from being unstable due to switching of the finder mode.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An imaging apparatus including an image pickup device for capturing a subject image to acquire it as image data and capable of selecting either of a first finder mode for optical viewing of the subject image and a second finder mode for displaying the image data on a display unit to allow viewing of the image data, the imaging apparatus comprising:
   a temperature detection circuit for measuring a temperature of the image pickup device;
   a finder mode switching instruction part for switching between the first finder mode and the second finder mode; and
   a controller for inhibiting switching from the first finder mode to the second finder mode performed by the finder mode switching instruction part when the temperature exceeds a first threshold.

2. The imaging apparatus according to claim 1, wherein when the temperature exceeds a second threshold on condition that the second finder mode is selected, the controller causes the finder mode switching instruction part to perform switching from the second finder mode to the first finder mode.

3. The imaging apparatus according to claim 2, wherein the first threshold is lower than the second threshold.

4. The imaging apparatus according to claim 1, further comprising a phase-difference focus detection sensor, wherein
   when the first finder mode is selected, a focus detection operation is performed using the phase-difference focus detection sensor, while when the second finder mode is set, a contrast detection focusing operation is performed based on the image data.

5. The imaging apparatus according to claim 1, further comprising a light metering circuit for measuring the luminance of a light beam from a subject, wherein
   when the first finder mode is selected, the brightness of the subject is measured using the light metering circuit, while when the second finder mode is selected, the brightness of the subject is measured based on the image data.

6. The imaging apparatus according to claim 1, further comprising:
   an optical blur compensation part for performing optical compensation for vibration of the imaging apparatus; and
   an electronic blur compensation part for performing electronic compensation for vibration of the imaging apparatus,
   wherein when the first finder mode is selected, the optical blur compensation part is used, while when the second finder mode is selected, the electronic blur compensation part is used.

7. The imaging apparatus according to claim 1, wherein the first and second finder modes are set according to a shooting mode.

8. An imaging apparatus including an image pickup device for capturing a subject image to acquire it as image data and capable of selecting either of a first finder mode for optical viewing of the subject image and a second finder mode for displaying the image data on a display unit to allow viewing of the image data, the imaging apparatus comprising:
   a noise level detection circuit for detecting a noise level of the image pickup device;
   a finder mode switching instruction part for switching between the first finder mode and the second finder mode; and
   a controller for inhibiting switching from the first finder mode to the second finder mode performed by the finder mode switching instruction part when the noise level exceeds a first threshold.

9. The imaging apparatus according to claim 8, wherein when the noise level exceeds a second threshold on condition that the second finder mode is selected, the controller causes the finder mode switching instruction part to perform switching from the second finder mode to the first finder mode.

10. The imaging apparatus according to claim 9, wherein the first threshold is lower than the second threshold.

11. The imaging apparatus according to claim 8, further comprising a phase-difference focus detection sensor, wherein
when the first finder mode is selected, a focus detection operation is performed using the phase-difference focus detection sensor, while when the second finder mode is set, a contrast detection focusing operation is performed based on the image data.

12. The imaging apparatus according to claim 8, further comprising a light metering circuit for measuring the luminance of a light beam from a subject, wherein
when the first finder mode is selected, the brightness of the subject is measured using the light metering circuit, while when the second finder mode is selected, the brightness of the subject is measured based on the image data.

13. The imaging apparatus according to claim 8, further comprising:
an optical blur compensation part for performing optical compensation for vibration of the imaging apparatus; and
an electronic blur compensation part for performing electronic compensation for vibration of the imaging apparatus,
wherein when the first finder mode is selected, the optical blur compensation part is used, while when the second finder mode is selected, the electronic blur compensation part is used.

14. The imaging apparatus according to claim 8, wherein the first and second finder modes are set according to a shooting mode.

15. An imaging apparatus including an image pickup device for capturing a subject image to acquire it as image data and capable of selecting either of a first finder mode for optical viewing of the subject image and a second finder mode for displaying the image data on a display unit to allow viewing of the image data, the imaging apparatus comprising:
a temperature detection circuit for measuring a temperature of the image pickup device;
a finder mode switching instruction part for switching between the first finder mode and the second finder mode; and
a controller for causing the finder mode switching instruction part to perform switching from the second finder mode to the first finder mode when the temperature exceeds a second threshold on condition that the second finder mode is selected, and causing the display unit to change from display of the subject image to display of the temperature.

16. The imaging apparatus according to claim 15, wherein when the temperature becomes lower than a first threshold while the temperature is being displayed on the display unit, the controller causes the display unit to stop the display of the temperature.

17. The imaging apparatus according to claim 16, wherein the first threshold is lower than the second threshold.

18. An imaging apparatus including an image pickup device for capturing a subject image to acquire it as image data and capable of selecting either of a first finder mode for optical viewing of the subject image and a second finder mode for displaying the image data on a display unit to allow viewing of the image data, the imaging apparatus comprising:
a preparation instruction part for causing preparation for acquiring image data of a still image from the image pickup device;
a temperature detection circuit for measuring a temperature of the image pickup device;
a finder mode switching instruction part for switching between the first finder mode and the second finder mode; and
a controller for causing the finder mode switching instruction part to perform switching from the second finder mode to the first finder mode when the temperature exceeds a predetermined threshold on condition that the second finder mode is selected,
wherein the controller inhibits the switching operation performed by the finder mode switching instruction part while the preparation instruction part is being operated.

19. The imaging apparatus according to claim 18, wherein the preparation instruction part performs a contrast detection focusing operation based on the image data.

20. The imaging apparatus according to claim 18, wherein the preparation instruction part measures brightness of a subject based on the image data.

21. An imaging apparatus including an image pickup device for capturing a subject image to acquire it as image data and capable of selecting either of a first finder mode for optical viewing of the subject image and a second finder mode for displaying the image data on a display unit to allow viewing of the image data, the imaging apparatus comprising:
a temperature detection circuit for measuring a temperature of the image pickup device;
an interface circuit for acquiring image data from the image pickup device;
a finder mode switching instruction part for switching between the first finder mode and the second finder mode; and
a controller for changing operation conditions of the interface circuit to reduce power to be consumed by the image pickup device and the interface circuit when the temperature exceeds a first threshold on condition that the second finder mode is selected, and stopping a system of the imaging apparatus when the temperature exceeds a second threshold on condition that the second finder mode is selected,
wherein upon changing the operation conditions, the controller causes the interface circuit to reduce a drive frequency of the image pickup device and amount of data for one frame to be read from the image pickup device.

22. The imaging apparatus according to claim 21, wherein when the temperature becomes equal to or higher than the first threshold, the controller inhibits switching from the first finder mode to the second finder mode performed by the finder mode switching instruction part.

23. The imaging apparatus according to claim 22, wherein the first threshold is lower than the second threshold.

* * * * *